United States Patent [19]

Enokida et al.

[11] Patent Number: 5,444,550
[45] Date of Patent: Aug. 22, 1995

[54] IMAGE PROCESSING APPARATUS

[75] Inventors: Miyuki Enokida, Yokohama; Yoshinobu Mita, Kawasaki; Junichi Shishizuka, Tokyo, all of Japan

[73] Assignee: Canon Kabushiki Kaisha, Tokyo, Japan

[21] Appl. No.: 982,116

[22] Filed: Nov. 25, 1992

Related U.S. Application Data

[63] Continuation of Ser. No. 513,982, Apr. 4, 1990.

[30] Foreign Application Priority Data

| Apr. 28, 1989 | [JP] | Japan | 1-109504 |
| Apr. 28, 1989 | [JP] | Japan | 1-109506 |
| Apr. 28, 1989 | [JP] | Japan | 1-109508 |
| Apr. 28, 1989 | [JP] | Japan | 1-109509 |
| Apr. 28, 1989 | [JP] | Japan | 1-109510 |
| Apr. 28, 1989 | [JP] | Japan | 1-109518 |
| Apr. 28, 1989 | [JP] | Japan | 1-109519 |
| Apr. 28, 1989 | [JP] | Japan | 1-109523 |
| Apr. 28, 1989 | [JP] | Japan | 1-109524 |

[51] Int. Cl.⁶ .................................... H04N 1/387
[52] U.S. Cl. ........................... 358/453; 358/448
[58] Field of Search ............... 358/451, 449, 443, 452, 358/453, 451, 449, 448; 395/146, 147

[56] References Cited

U.S. PATENT DOCUMENTS

| 4,338,636 | 7/1982 | Yamada et al. | 358/256 |
| 4,500,919 | 2/1985 | Schreiber | 358/78 |
| 4,617,596 | 10/1986 | Yoshida et al. | 358/280 |
| 4,639,771 | 1/1987 | Hattori et al. | 358/80 |
| 4,727,435 | 2/1988 | Otani et al. | 358/296 |
| 4,760,458 | 7/1988 | Watanabe et al. | 358/256 |
| 4,760,463 | 7/1988 | Nonuyama et al. | 358/453 |
| 4,789,900 | 12/1988 | Takahashi | 358/449 |
| 4,797,748 | 1/1989 | Kotani et al. | 358/438 |
| 4,797,943 | 1/1989 | Murayama | 382/54 |
| 4,814,893 | 3/1989 | Katoh | 358/451 |
| 4,837,635 | 6/1989 | Santos | 358/453 |
| 4,893,258 | 1/1990 | Sakuragi | 364/521 |
| 4,897,735 | 1/1990 | Oneda | 358/449 |
| 4,905,185 | 2/1990 | Sakai | 395/146 |
| 4,942,479 | 7/1990 | Kammo | 358/453 |
| 4,958,237 | 9/1990 | Kubota | 358/451 |
| 5,001,574 | 3/1991 | Shimizu et al. | 358/449 |
| 5,197,122 | 3/1993 | Miyashi et al. | 395/146 |

FOREIGN PATENT DOCUMENTS

| 0051294 | 5/1982 | European Pat. Off. | H04N 1/00 |
| 0175385 | 3/1986 | European Pat. Off. | H04N 1/32 |
| 0177640 | 4/1986 | European Pat. Off. | G06F 15/62 |
| 269746 | 6/1988 | European Pat. Off. | |
| 0309196 | 3/1989 | European Pat. Off. | H04N 1/387 |
| 58-97963 | 6/1983 | Japan | 358/453 |
| 59-104855 | 6/1984 | Japan | 358/453 |
| 58-104567 | 6/1988 | Japan | |
| 2082014 | 2/1982 | United Kingdom | H04N 1/40 |
| 2172464 | 9/1986 | United Kingdom | H04N 1/41 |
| 2089165 | 6/1988 | United Kingdom | |

*Primary Examiner*—Scott A. Rogers
*Assistant Examiner*—Thomas L. Stoll
*Attorney, Agent, or Firm*—Fitzpatrick, Cella, Harper & Scinto

[57] ABSTRACT

An image processing system in which an original to be transmitted to a destination system is input and is stored in a memory section, and the image in accordance with the data stored in the memory section is displayed by a display section. The operator designates a desired region of the displayed image. The partial image thereby designated is transferred to the destination system. It is thereby possible to transmit only a particular portion of the original image to the destination system.

17 Claims, 24 Drawing Sheets

| MONOCHROME BINARY | 01 |
| --- | --- |
| MULTIPLE-VALUED | 02 |
| MR | 03 |
| THREE COLOR BINARY | 04 |
| MULTIPLE-VALUED | 05 |
| FOUR COLOR BINARY | 06 |
| FOUR COLOR MULTIPLE-VALUED | 07 |
| COMPRESSED | 08 |

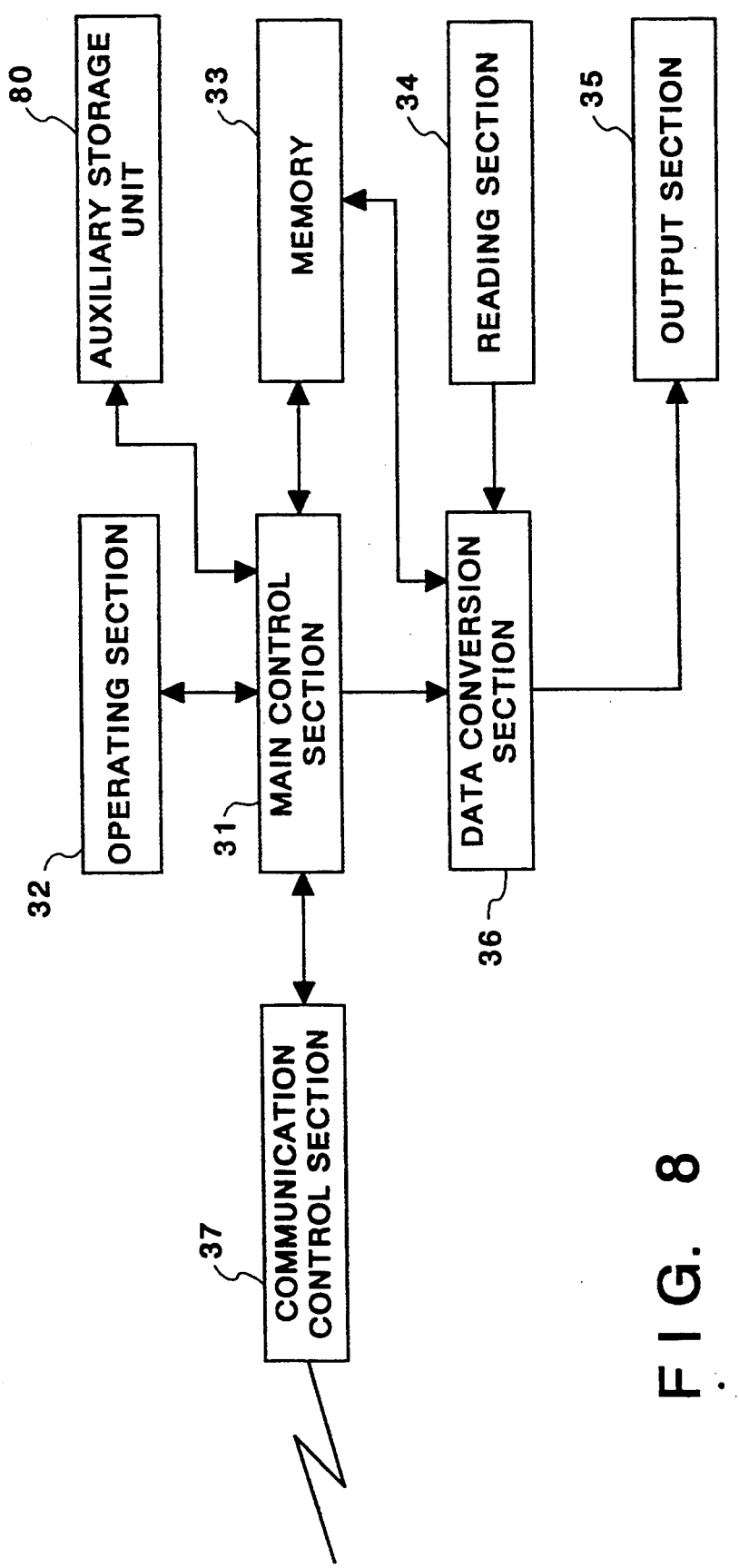
F I G. 8

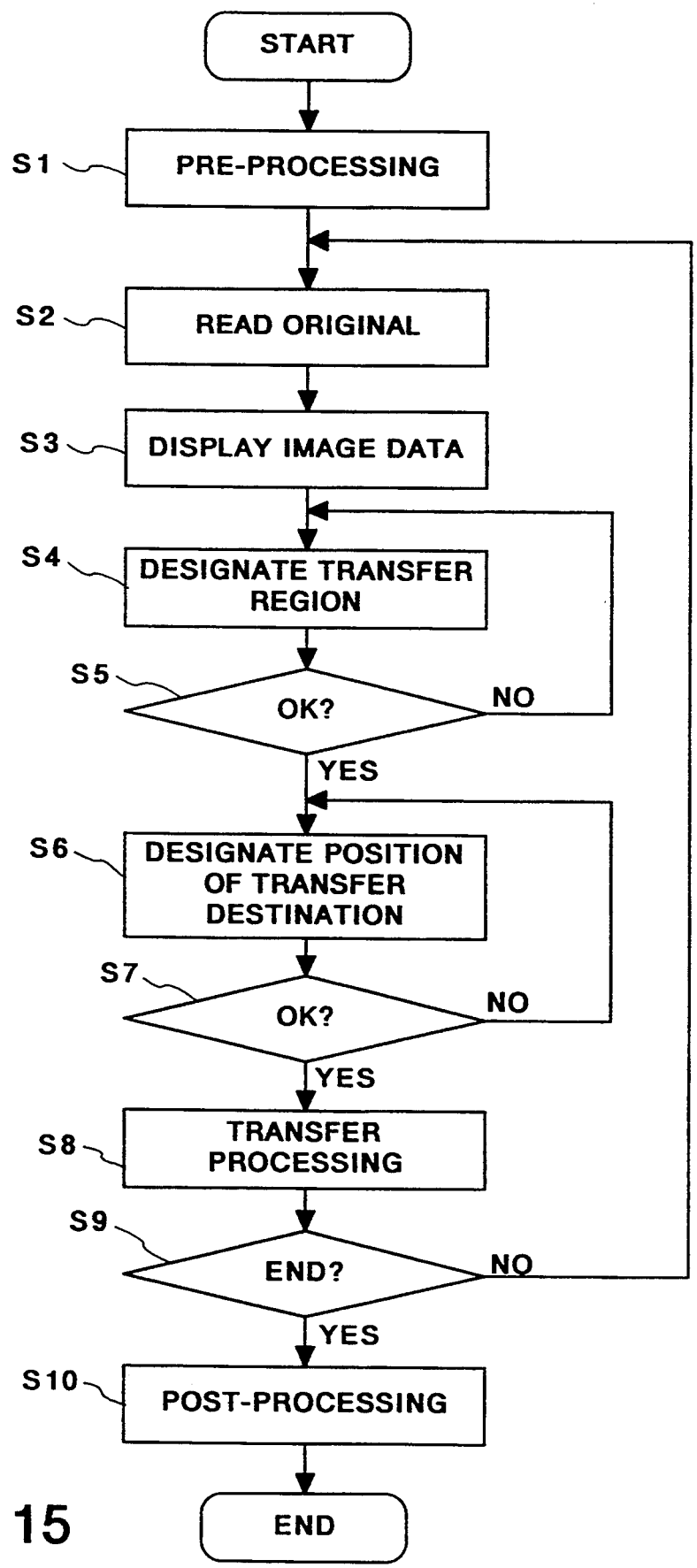
F I G. 15

IMAGE PROCESSING APPARATUS

This application is a continuation of application Ser No. 07/513,982, filed Apr. 4, 1990.

BACKGROUND OF THE INVENTION

This invention relates to an image processing system for effecting image communication with other systems.

This kind of system includes facsimile apparatuses or the like.

The operation of a conventional facsimile apparatus will be described below.

First, an original image is read and all of the image data is encoded on a transmission side. The encoded image data is transmitted to a destination apparatus through a communication line. A facsimile apparatus on the reception side reproduces image data from the encoded data and outputs a printing.

This system entails a problem in that if the operator wishes to transmit only a part of the original image, the whole original may be transmitted. To avoid this, the operator must make another original having only the desired part, which operation is time-consuming.

In a case where the size of an image to be transmitted is smaller than that of an output (recording) medium and it is necessary to output the image to a selected position on the recording medium, the original image must be remade manually in conformity with the desired output image. A similar problem is also encountered when particular portions of original images formed on a plurality of sheets are to be combined and transmitted.

SUMMARY OF THE INVENTION

The present invention has been achieved in view of the conventional art, and an object of the present invention is to provide an image processing system capable of transmitting a part of an original selected as desired.

To achieve this object, the present invention provides an image processing system for reading an image and transmitting the image to a destination system, comprising:

an input means for inputting image information;

a memory means for storing the image information input by the input means;

a display means for displaying the image information stored in the memory means;

a designation means for designating a desired region of the image displayed by the displayed means;

a transmission means for transmitting the information; and control means for controlling the system to transmit an image within the region designated by the designation means to the destination system by using the transmission means.

Another object of the present invention is to provide an image processing system capable of recording an image in accordance with image information transmitted from a communication terminal and output state information attached to the image information.

To achieve this object, the present invention provides an image processing system for outputting a record on a recording medium in accordance with image information transmitted from a system on the transmission side, comprising:

a reception means for receiving image information and output state information relating to the image information transmitted from the system on the transmission side;

a printing means for outputting printing on the recording medium in accordance with the image information; and a control means for controlling the system to print an image in accordance with the image information received by the reception means based on the content of the output state information.

Still another object of the present invention is to provide an image processing system capable of transmitting only a desired portion of an original image, receiving the image portion and recording the same on a recording medium.

To achieve this object, the present invention provides an image processing system for effecting transmission/reception of image information with a destination system, comprising:

an input means for inputting image information;

a memory means for storing the image information input by the input means;

a display means for displaying the image information stored in the memory means;

a designation means for designating a desired region of the image displayed by the display means;

a communication means for effecting transmission/reception of information;

a first control means for controlling the system to transmit an image within the region designated by the designation means to the destination system by using the communication means; and a second control means for controlling the system to print an image by the printing means in accordance with the image information received by the communication means.

A further object of the present invention is to provide an image processing system capable of editing a received image as desired, as well as simply printing this image.

To achieve this object, the present invention provides an image processing system for outputting a record on a recording medium in accordance with image information transmitted from a system on the transmission side, comprising:

a reception means for receiving image information transmitted from the system on the transmission side;

a memory means for storing the image information received by the reception means;

a display means for displaying the image information stored in the memory means;

an editing means for editing the image displayed by the display means;

a printing means for outputting an image record on the recording medium; and a control means for controlling the system to print an image by the printing means in accordance with information on the image edited by the editing means.

A still further object of the present invention is to provide an image processing system capable of utilizing a received original image as well as simply printing the same.

To achieve this object, the present invention provides an image processing system for effecting transmission/reception of image information with a destination system, comprising:

a communication means for effecting transmission/reception of information;

a memory means for storing image information received by the communication means together with information relating to the image information;

a display means for displaying information;

a display control means for controlling the system so that the display means displays a table of information relating to the image information stored in the memory means;

a designation means for designating one image information by selecting one item from the table of the information relating to the image information displayed under the control of the display control means; and a processing means for processing image information designated by the designation means.

A still further object of the present invention is to provide an image processing system capable of transmitting only desired portions of a plurality of originals while combining these portions.

To achieve this object, the present invention provides an image processing system for reading an image and transmitting the image to a destination system, comprising:

an input means for inputting a plurality of original images;

a memory means for storing image information input by the input means;

a display means for successively displaying images in accordance with the image information stored in the memory means;

a designation means for designating a desired region of each image displayed by said display means and a desired output position of said desired region;

an editing means for composing each partial image of each displayed image obtained by said designation means;

a transmission means for transmitting information; and a control means for controlling the system to transmit image information obtained by the editing means to the destination system.

A still further object of the present invention is to provide an image processing system capable of selecting an optimum size of a recording medium on which an image in accordance with image information transmitted is printed.

To achieve this object, the present invention provides an image processing system for outputting a record on a recording medium in accordance with image information transmitted from a system on the transmission side, comprising:

a printing means for selecting one of recording mediums having different sizes and for recording an image output;

a reception means for receiving image information on at least one image and output state information relating to the image information transmitted from the system on the transmission side; and a control means for controlling the system to effect printing using the printing means by selecting one of the recording mediums based on the size of the image of the received image information and the output state information relating to the image information.

A still further object of the present invention is to provide an image processing system which makes it possible to readily view the whole of an image received or read to be transmitted, and which is capable of displaying the image while optimizing the facility with which the contents of the image are confirmed.

To achieve this object, the present invention provides an image processing system for effecting transmission/reception of image information with a destination system, comprising:

a reading means for reading out an original image;

a communication means for effecting transmission/reception of image information;

a display means for displaying information;

a memory means for storing image information read by the reading means or image information received by the communication means; and a control means for effecting magnification change processing such that the size of the image information stored in the memory means makes maximum in an image display enabled region of the display means when the image information is used to display an erect image by the display means.

A still further object of the present invention is to provide an image processing system which makes it possible to edit a read or received original image, as well as to print the edited image on a recording sheet having an optimum size.

To achieve this object, the present invention provides an image processing system for effecting transmission/reception of image information with a destination system, comprising:

a reading means for reading out an original image;

a communication means for effecting transmission/reception of image information;

a first display means for displaying information;

a memory means for storing image information read by the reading means or image information received by the communication means;

a second display means for displaying image information stored in the memory means;

an editing means for editing an image displayed by the display means;

a printing means for selecting one of recording mediums having different sizes and for recording an image output;

a control means for selecting one of the recording mediums based on the size of the image in accordance with the image information formed by editing with the edition means, and for processing the image stored in the memory means and outputting the processed image to the printing means.

Other objects, features and effects of the present invention will become apparent upon reading the following description taken in conjunction with the accompanying drawings.

BRIEF DESCRIPTION OF THE DRAWINGS

FIG. 8 is a schematic diagram of the construction of an image processing apparatus which represents another embodiment of the present invention;

FIG. 15 is a flow chart of a process of transmitting a combined image by using an image memory capable of storing one sheet of original image;

DESCRIPTION OF THE PREFERRED EMBODIMENTS

Figure 1:
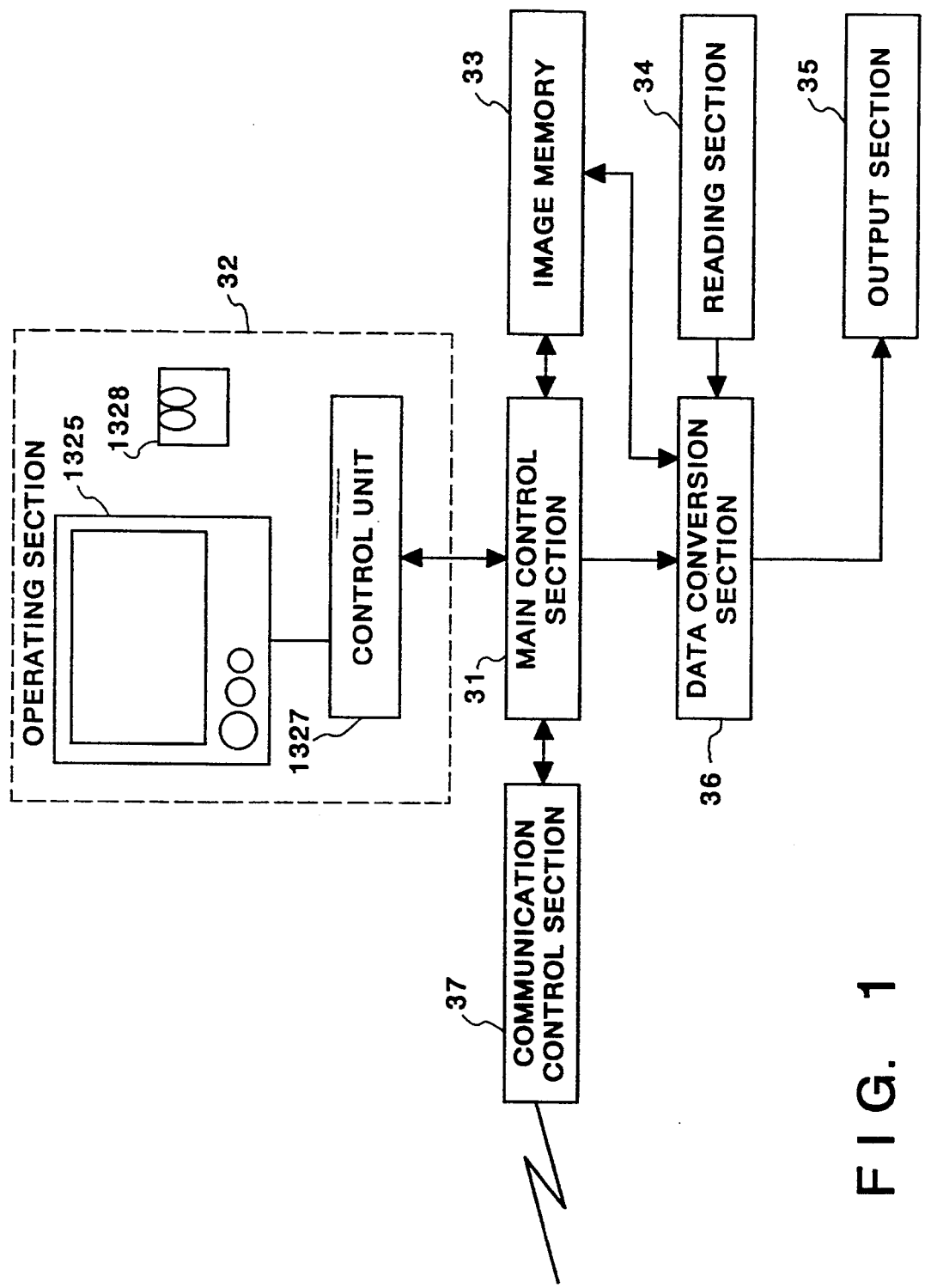
FIG. 1 is a schematic diagram of the construction of an image processing system which presents an embodiment of the present invention.

FIG. 1 shows the construction of an image processing system which represents an embodiment of the present invention.

The system shown in FIG. 1 has a main control section 31 for overall control of the system, an operating section 32, an image memory 33, and a data conversion section 36. The operating section 32 has a monitor 1325 for displaying images, a pointing device 1328 through which the operator inputs information on various instructions, and a control unit for controlling these components. The image memory 33 stores image data read by a reading section 34 as well as image data transmitted from a destination system. The data conversion section 36 converts the data read through the reading section 34 into transmission data to be transmitted to the destination system, or converts the format of received transmission data into a format for supply to the output section 35.

In this embodiment, two apparatuses each having the construction shown in FIG. 1 are connected via a communication line.

Figure 9A:
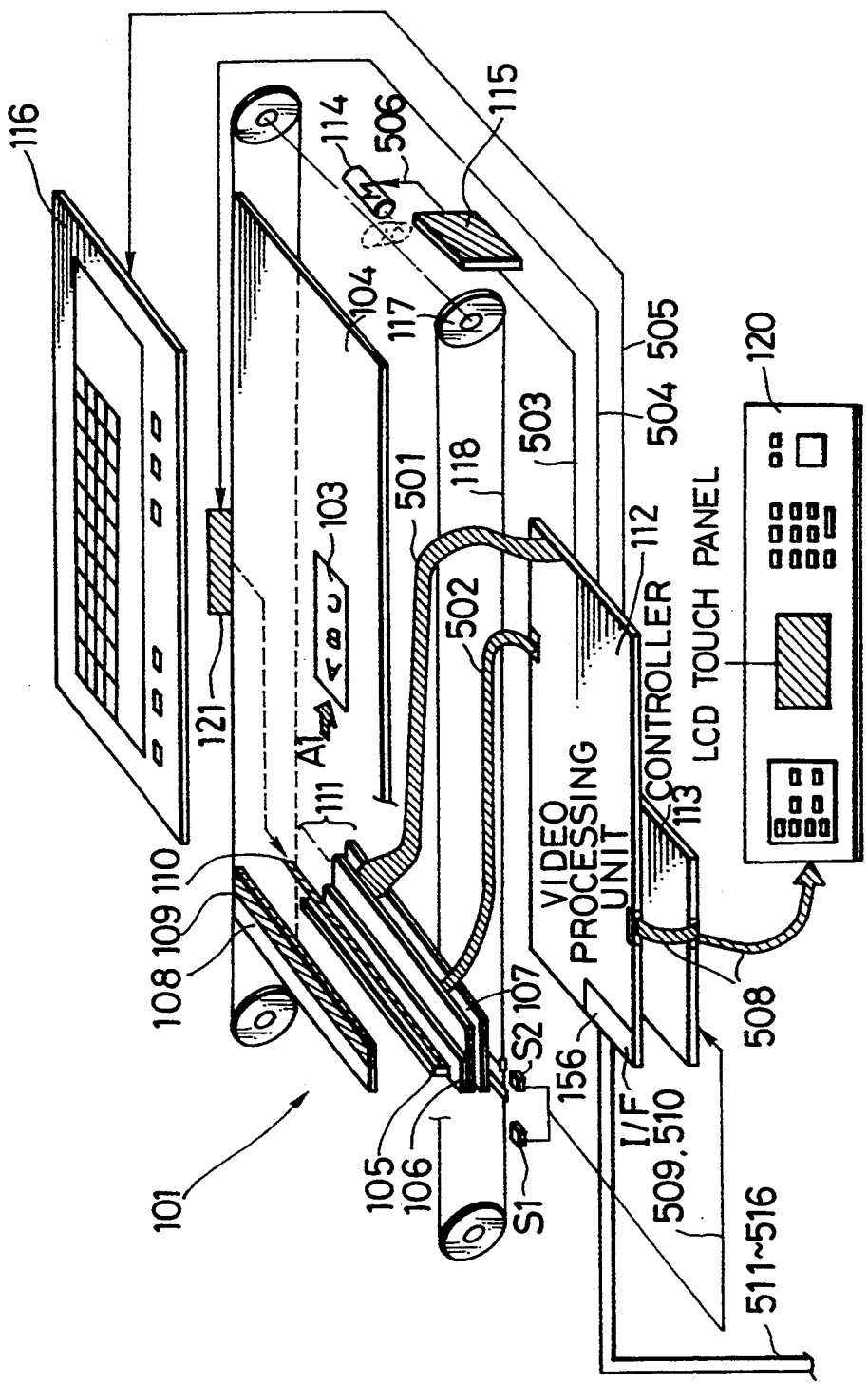
FIGS. 9A and 9B are diagrams of the construction of an image reading section and a printing section of the above embodiments.
Figure 9B:
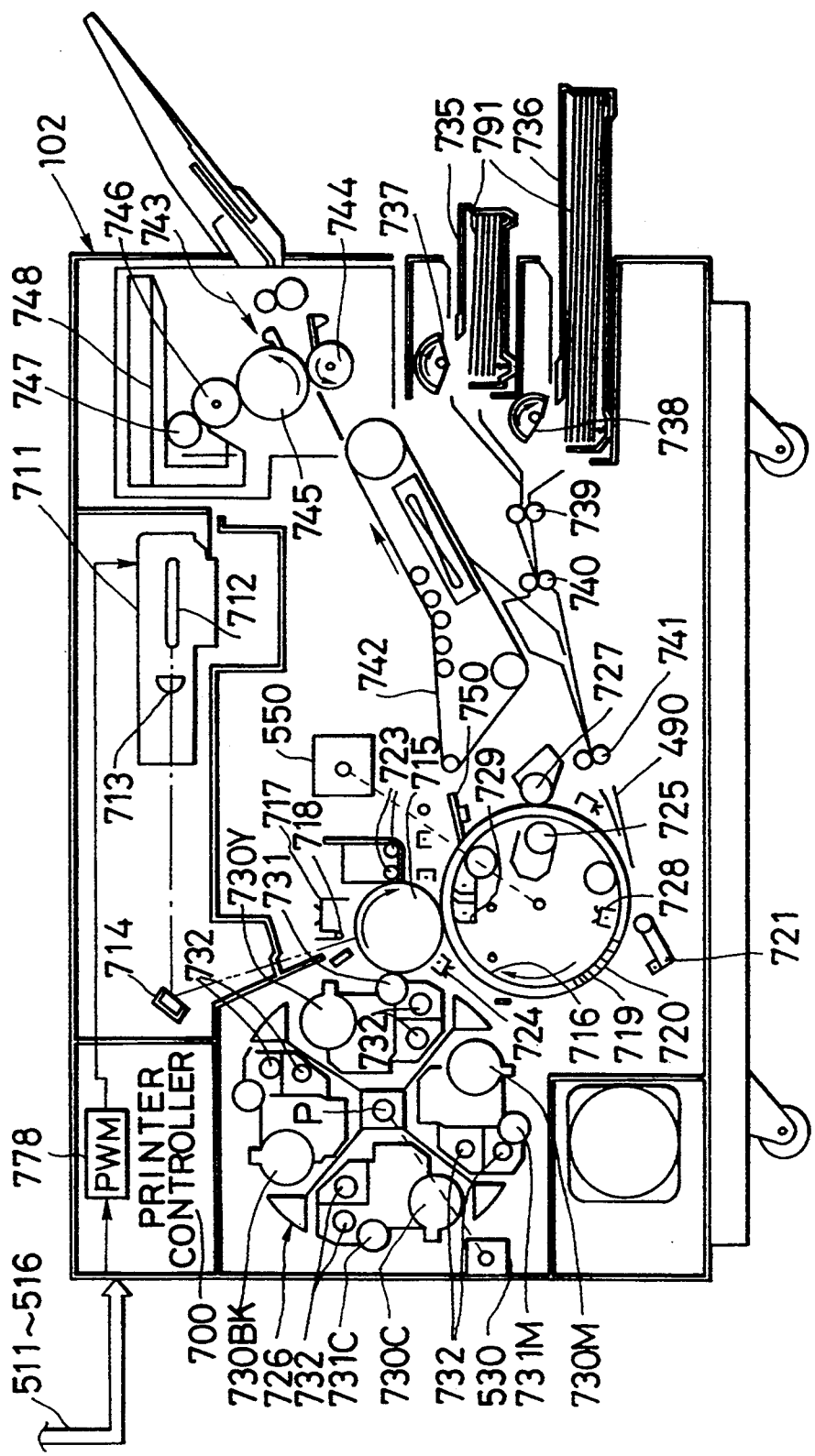

FIGS. 9A and 9B show examples of the constructions of the reading section 34 and the output section 35. As illustrated, a digital color image reader (hereinafter referred to as "color scanner") 101 is placed on a digital color image printer (hereinafter referred to as "color printer") 102. The color scanner 101 corresponds to the reading section 34 shown in FIG. 1, and the color printer 102 corresponds to the output section 35. The color scanner 101 reads color image information on an original with respect to each of color components (R, G, B) by using a color decomposition means and a photoelectric conversion element such as CCD, and converts the read information into an electrical digital video signal. The color printer 102 is an electrophotography type laser beam color printer which reproduces the color image from the digital video signal with respect to each of color components (Y, M, C, Bk) and transfers digital pixels in the form of dots to a sheet of recording paper a plurality of times, thereby recording the image.

The color scanner 101 will be schematically described first.

An original 103 is placed on a platen glass 104. A rod array lens 105 condenses reflection light from the original subjected to exposure scanning with a halogen exposure lamp 110 to input an image of the original into a ×1-magnification type full color sensor 106. The rod array lens 105, the full color sensor 106, a sensor output signal amplification circuit unit 107 and the exposure lamp 110, which constitute an original scanning unit 111, are integrally moved in the direction of the arrow A1 to effect exposure scanning. The color decomposed video signal read at every line during exposure scanning is amplified to a predetermined voltage level by the sensor output signal amplification circuit 107 and is supplied to a video processing unit 112 via a signal line 501 to be processed. The signal line 501 is constituted by coaxial cables capable of ensuring high-fidelity signal transmission. A signal line 502 serves to supply pulses necessary for driving the ×1-magnification full color sensor 106, which pulses are generated by the video processing unit 112. A white plate 108 for white level correction of the video signal and a black plate 109 for black level correction are irradiated with the halogen exposure lamp 110 to obtain determined density signal levels respectively for white level correction and black level correction of the video signal. A control unit 113 having a microcomputer controls display on a operation panel 120 through a bus 508, key input, and the operation of the video processing unit 112. The control unit 113 detects the position of the original scanning unit 111 by signals supplied from position sensors S11 and S21 through signal lines 509 and 510. The control unit 113 also controls a stepping motor driver 115 for pulse-driving a stepping motor 114 for moving the scanning unit 111 through a signal line 503, the on-off operation of the halogen exposure lamp 10 with an exposure lamp driver through a signal line 504, and the amount of light emitted from this lamp. The control circuit 113 further controls a digitizer 116 through a signal line 505, internal keys, a display section and so on, thus effecting overall control of the color scanner 101. The color video signal read by the exposure scanning unit 111 during exposure scanning over the original is supplied to the video processing unit 112 through the amplification circuit 107 and the signal line 501, is processed in the unit 112 by various kinds of processing described later, and is sent to the printer section 102 through an interface circuit 156.

Next, the color printer 102 will be schematically described below. A scanner 711 has a laser output unit (not shown) for converting the video signal from the color scanner section 101 into an optical signal, polygon (e.g., octahedron) mirror 712, a motor (not shown) for rotating the mirror 712, an f/θ lens (imaging lens) 713, and so on. An output from the scanner 711 is sent to a reflection mirror 714 for changing the optical path of laser light and to a photosensitive drum 715. Laser light emitted from the laser output unit is reflected by one side surface of the polygon mirror 712 and travels through the f/θ lens 713 and the mirror 714 to linearly scan (raster-scan) the surface of the photosensitive drum 715 rotating in the direction of the arrow shown in FIGS. 9A and 9B, thereby forming an electrostatic latent image corresponding to the original image on the surface of the photosensitive drum 715.

A primary electrifier 717, a whole surface exposure lamp 718, a cleaner section 723 for recovering a residual toner untransferred and an ante-transfer electrifier 724 are disposed around the photosensitive drum 715.

A development unit 726 for developing, by laser exposure, the electrostatic latent image formed on the photosensitive drum 715 is constructed as described below. The development unit 726 has development sleeves 731Y, 731M, 731C, and 731Bk to be brought into contact with the photosensitive drum 715 for direct development, toner hoppers 730Y, 730M, 730C, and 730Bk for retaining reserved toners, and screws 732 for transporting developers. The sleeves 731Y to 731Bk, the toner hoppers 730Y to 730Bk and the screws 732 are disposed around a rotary shaft P of the development unit. The reference symbols Y, M, C, and Bk for the respective components represent colors, that is, "Y" represents yellow, "M" magenta, "C" cyan and "Bk" black. To form a yellow toner image, yellow toner development is effected while the development unit is maintained in the position indicated in FIGS. 9A and 9B. To form a magenta toner image, the development unit 726 is rotated on the shaft P so that the development sleeve 731M of the magenta development section is brought into contact with the photosensitive body 715. The development unit 726 is operated in the same manner for cyan or black development.

The toner image formed on the photosensitive drum 715 is transferred to a sheet of printing paper by a transfer drum 716. An actuator plate 719 is provided for detection of the position of the transfer drum 716. A position sensor 720 is capable of being brought close to the actuator plate 719 to detect that the transfer drum 716 is moved to a home position. The actuator plate 719, the position sensor 720, a drum cleaner 725, a sheet retaining roller 727, a discharging device 728 and a transfer electrification device 729 are disposed around the transfer roller 716.

Sheets of printing paper are provided in sheet supply cassettes 735 and 736. For example, in this embodiment, A4 size sheets are placed in the sheet supply cassettes 735 while A3 size sheets are placed in the sheet supply cassette 736. Each of sheet supply rollers 737 and 738 serves to supply printing sheets out of the cassette 735 or 736. Timing rollers 739, 740, and 741 serve to control the timing of sheet supply and transportation. A printing sheet transported by these rollers is led by a sheet guide 749 and is wound around the transfer drum 716 while being retained at its leading end by a gripper described later, and thereafter undergoes an image formation process. One of the sheet supply cassettes 735 and 736 is selected based on an instruction from the main control section 31, and only the sheet supply roller for the selected cassette is rotated.

A drum rotating motor 550 rotates the photosensitive drum 715 and the transfer drum 716 in a synchronized relationship. A separator claw 750 has a function of separating from the transfer drum 716 the printing sheet attached to the transfer drum 716 by static electricity, after the image formation process has been finished. A transportation belt 742 transports the separated printing sheet, and an image fixing unit 743 fixes the image on the printing sheet transported by the transportation belt 742. The image fixing unit 743 has a pair of heat-press rollers 744 and 745.

The control unit 113 of the scanner section 101 will be described below with reference to FIG. 10.

The control unit 113 has a CPU 122 constituted by a microcomputer, a program ROM 123, RAMs 124 and 125 and other components and is arranged to control, in an organic manner, video signal processing, the lamp driver 121, the stepping motor driver 115, the digitizer 116 and the scanning panel 120 for exposure and scanning through the signal line (bus) 508 and the signal lines 503, 504, and 505, and to thereby effect desired copying. Non-volatile performance of the RAM 125 is ensured by the use of a battery 131. A signal line ordinarily used for serial communication is used for the signal line 505. The operator inputs data into this line through the digitizer 116 in conformity with the protocol between the CPU 122 and the digitizer 116. That is, information on editing the original, e.g., data on coordinate/region designation relating to movement or synthesis, copying mode designation, magnification change designation, and so on is transferred through the signal line 505. Information on designation of the scanning speed, scanning distance, going and returning movements and so on is sent to the motor driver 115 through the signal line 503 under the control of the CPU 122. The motor driver 115 outputs desired pulses to the stepping motor 114 for moving the original scanning unit 111 in accordance with instructions from the CPU122, thereby rotating the motor 114.

The control section 113 has serial interfaces 129 and 130 each of which may be an ordinary interface constituted by a serial interface LSI such as "8251" made by Intel Corp. Each of the digitizer 116 and the motor driver 115 has a similar circuit (not shown).

Of the sensors S11 and S21 for detecting the position of the original exposure scanning unit 111, the sensor S11 serves to detect a home position. When the original scanning unit 111 is in the home position, white level correction of the video signal is effected. The sensor S21 serves to detect that the original exposure scanning unit is positioned at the leading end of the image. This position is used as a reference position of the original.

Figure 10:
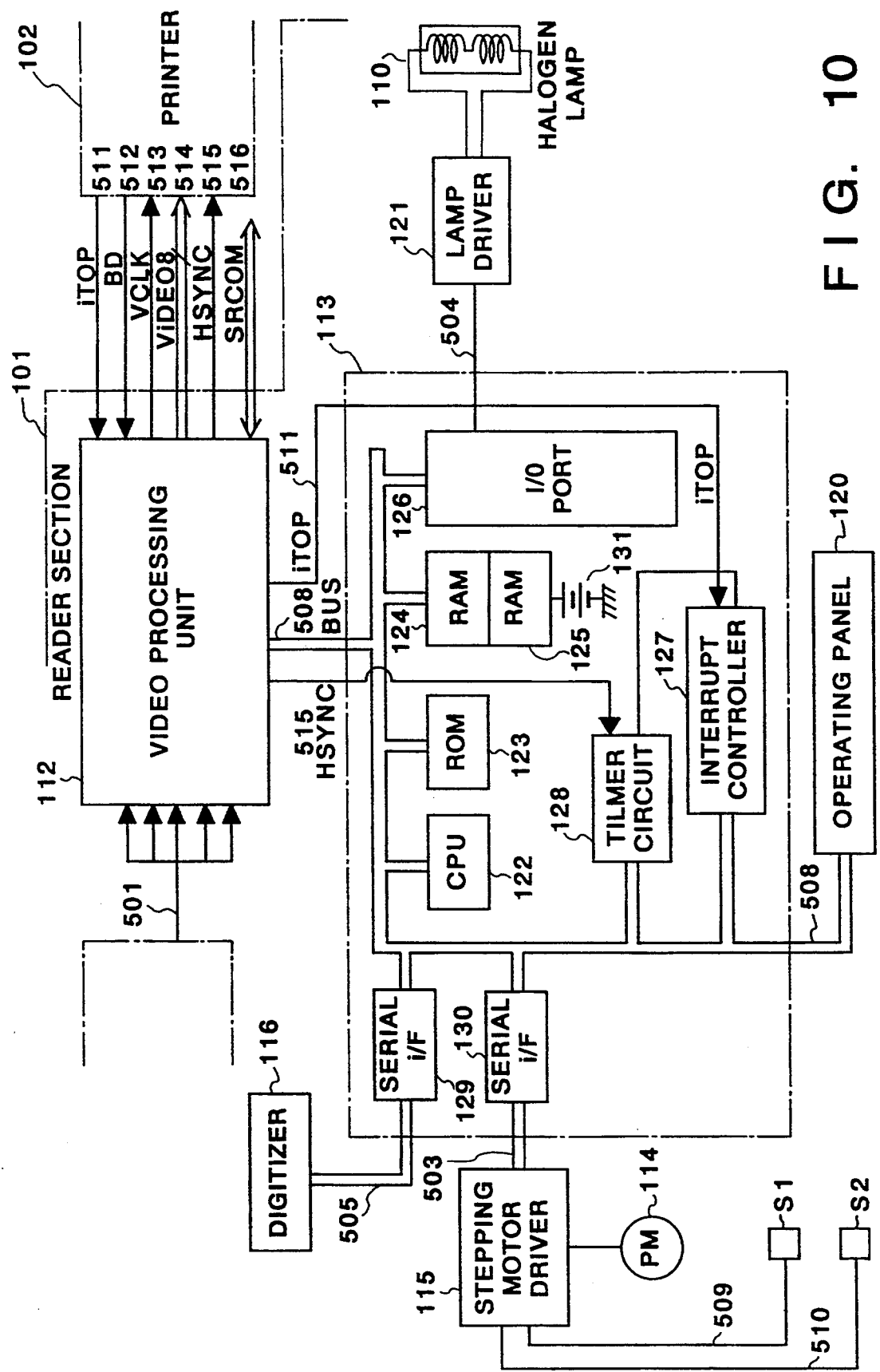
FIG. 10 is a diagram of a controller and relating sections.

Signals ITOP511, BD512, VCLK513, VIDEO514, HSYNC515, and SRCOM516 shown in FIG. 10 are signals transmitted through the interface between the color printer section 102 and the scanner section 101 shown in FIGS. 9A and 9B. Video signal VIDEO514 obtained by reading in the scanner section 101 is sent to the color printer section 102 based on all the other signals. Signal ITOP is a signal for synchronization in the image feed direction (sub scanning direction). Signal ITOP rises each time one frame is supplied, that is, rises one time for each color frame of an image having four colors (yellow, magenta, cyan and black), i.e., a total of four times. Signal ITOP is synchronized with the rotation of the transfer drum 716 and the rotation of the photosensitive drum 715 in order that the leading end of the transfer sheet wound around the transfer drum 716 of the color printer section 102 is correctly positioned relative to the leading end image of the original when the toner image is transferred to the transfer sheet at the point of contact between the transfer drum 716 and the photosensitive drum 715. Signal ITOP is also sent to the video processing unit 112 of the scanner section 101 and is also used for sub scanning direction image control for editing and so on based on the interrupt of the CPU 122 in the controller 113. Signal BD512 is a signal for synchronization in the raster scanning direction (main scanning direction). Signal BD512 rises each time the polygon mirror 712 makes one round, i.e., rises one time for one cycle of raster scanning. The video signal read in the scanner section 101 is sent to the printer section 102 in synchronism with signal BD generated for each line with respect to the main scanning direction. Signal VCLK513 serves as sync clock for supplying the 8-bit digital video signal 514 to the color printer section 102. Video signal 514 is sent to the color printer 102 through a flip flop circuit in synchronism with signal VCLK513. Signal HSYNC515 is a main scanning direction sync signal formed from signal BD512 in synchronism with signal VCLK513 and has the same period as signal BD512. Strictly speaking, signal VIDEO514 is sent in synchronism with signal HSYNC515. Signal BD515 is generated in synchronism with the rotation of the polygon mirror 712 and therefore contains a large amount of jitter of the motor for driving the polygon mirror 712. That is, if the video signal is directly synchronized with signal BD512, the resulting image contains jitter and it is therefore necessary to use signal HSYNC515 which is generated in synchronism with signal VCLK free from jitter. Signal SRCOM516 is a signal for semi-double two way serial transmission, all exchanges of information between the scanner section 101 and the printer section 102 are effected through the medium of signal SRCOM, including the supply of instructions from the scanner section 101 to the printer section 102, e.g., a color mode selection instruction and a cassette selection instruction, and the supply of information on the state of the printer section, e.g., information on jamming, lack of paper, and waiting.

The operation of this embodiment will be described below with reference to the drawings.

Figure 2A:
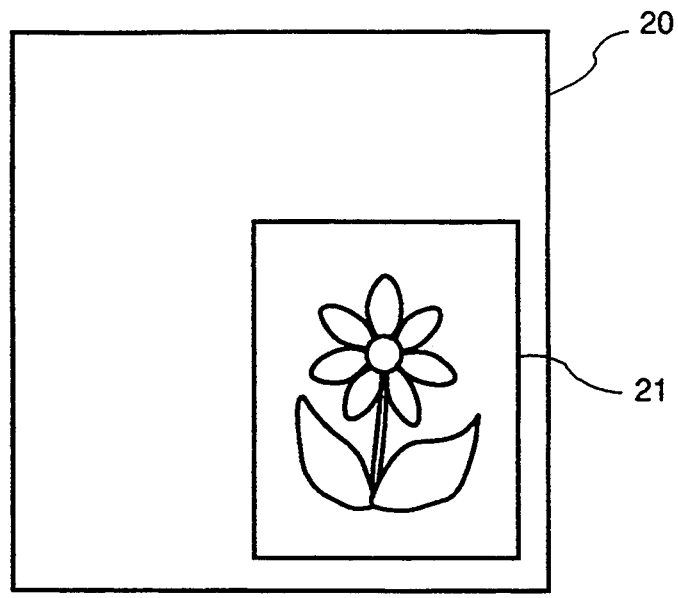
FIGS. 2A and 2B are diagrams showing a movement of an image.
Figure 2B:
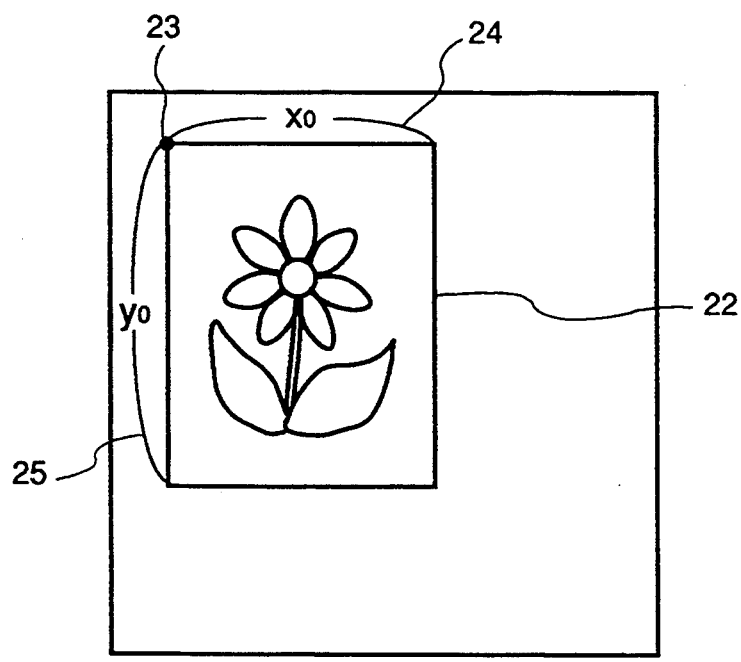

The following description relates to a case where an original 20 such as that shown in FIG. 2A to be transmitted is provided and a portion of the original surrounded by a frame line indicated by a reference symbol 21 is output while changing the output position as shown in FIG. 2B. First, the original 20 is read through the reading section 34 and is stored as image data in the memory 33 and is displayed on the display section 38. Thereafter, the region 21 to be transmitted is designated in a display section 38 through the operating section 32 by using the pointing device 1328 and a cursor linked to the operation of the digitizer. Similarly, the output position of the image data on the output sheet on the reception side is set by designating the address of the position of an output start point 23 as shown in FIG. 2B. In response to this operation, the main control section 31 calculates which portion of the image data stored in the memory 33 is transmitted.

Figures 3, 4:
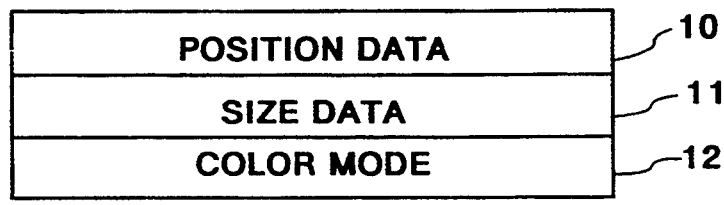
FIG. 3 is a diagram of additional information used at the time of partial image transmission.
FIG. 4 is a diagram of categories of color mode information in the additional information shown in FIG. 3, showing the relationship between the categories values.

It is assumed here that the number of pixels in the main scanning direction in the region 21 shown in FIG. 2A, which corresponds to the size $X_0$ in the X axis direction indicated by 24 in FIG. 2B, is 500, while the number of pixels in the sub scanning direction, which corresponds to the size $Y_0$ indicated at 25 in FIG. 2B, is 1000, that the address of the output start point 23 on the sheet shown in FIG. 2B is expressed by x=100 and y=75, and that the data to be transmitted is set in a full color format of 8 bits for each of red, green and blue colors and is transmitted in a non-compressed state. The information on this setting is transmitted, as an annex information to the image data to be transmitted, to the destination system in accordance with the format shown in FIG. 3, before the image data is transmitted. Referring to FIG. 3, there are three categories of information: information 10 on the position of the point at which image data output on the output sheet on the reception (destination) side is started (the coordinates of the point 23 in the example of FIG. 2B); information 11 on the size of the region of the output image data (the number of pixels in the main scanning direction and the number of pixels in the sub scanning direction); and color mode information 12 for discriminating attributes or the like of the image data to be transmitted. Codes for color mode information in accordance with this embodiment are determined as shown in the table of FIG. 4. In accordance with this embodiment, the information to be transmitted prior to the image information is as shown in FIG. 5 and it is prepared in the main control section 31.

The control of communication is as described below.

Figure 5:
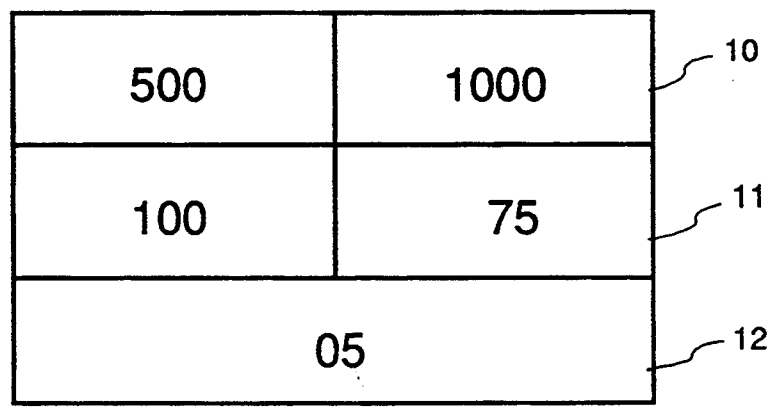
FIG. 5 is a diagram of an example of the additional information.

For communication control, a communication protocol is first transmitted to the communication destination system designated through the operating section 32, a command is then issued to clear the memory of the destination system (on the reception side), and additional information such as that shown in FIG. 5 is transmitted. Desired image data is thereafter transmitted and the transmission operation is terminated.

The operation of the system on the reception side is as described below.

The system on the reception side clears its memory in response to the memory clear request from the transmission terminal, and writes the image data transmitted after the request into the reception side memory 33 based on the received additional information. Thereafter, the information written in the memory can be output to a recording sheet through the output section 35 by an instruction from the operator, thereby obtaining an output image such as that shown in FIG. 2B.

At the time of reception of image data, a message is displayed to indicate that the image data is received.

The embodiment is described above with respect to a process of transmitting and outputting an image formed on one sheet. However, it is possible to output composite images formed on a plurality of sheets by repeating region designation and transmission. As can be easily supposed, the format of image data to be transmitted is not limited to one type in the case where images on a plurality of sheets are combined. The format of color mode information is not limited to that shown in the table of FIG. 4, and data in any image data format can be transmitted by changing the data conversion section 36. For example, a compression format may also be transmitted in the case of transmission of compressed data.

An example of a process of editing received image data in the system on the reception side and outputting the edited data will be described below.

To simplify the description, an enlargement process conducted as an editing function will be explained. It is assumed here that image data received by the system on the reception side is equal to that shown in FIG. 2B and is already stored in the image memory 33 of the system on the reception side, and that the magnification is 2 with respect to each of the x- and y-directions. As mentioned above, where additional information such as that shown in FIG. 5 is received before the transmission of image data, the image data start position, i.e., the top address in the image memory 33 can be calculated from the position information in the additional information.

Figure 7:
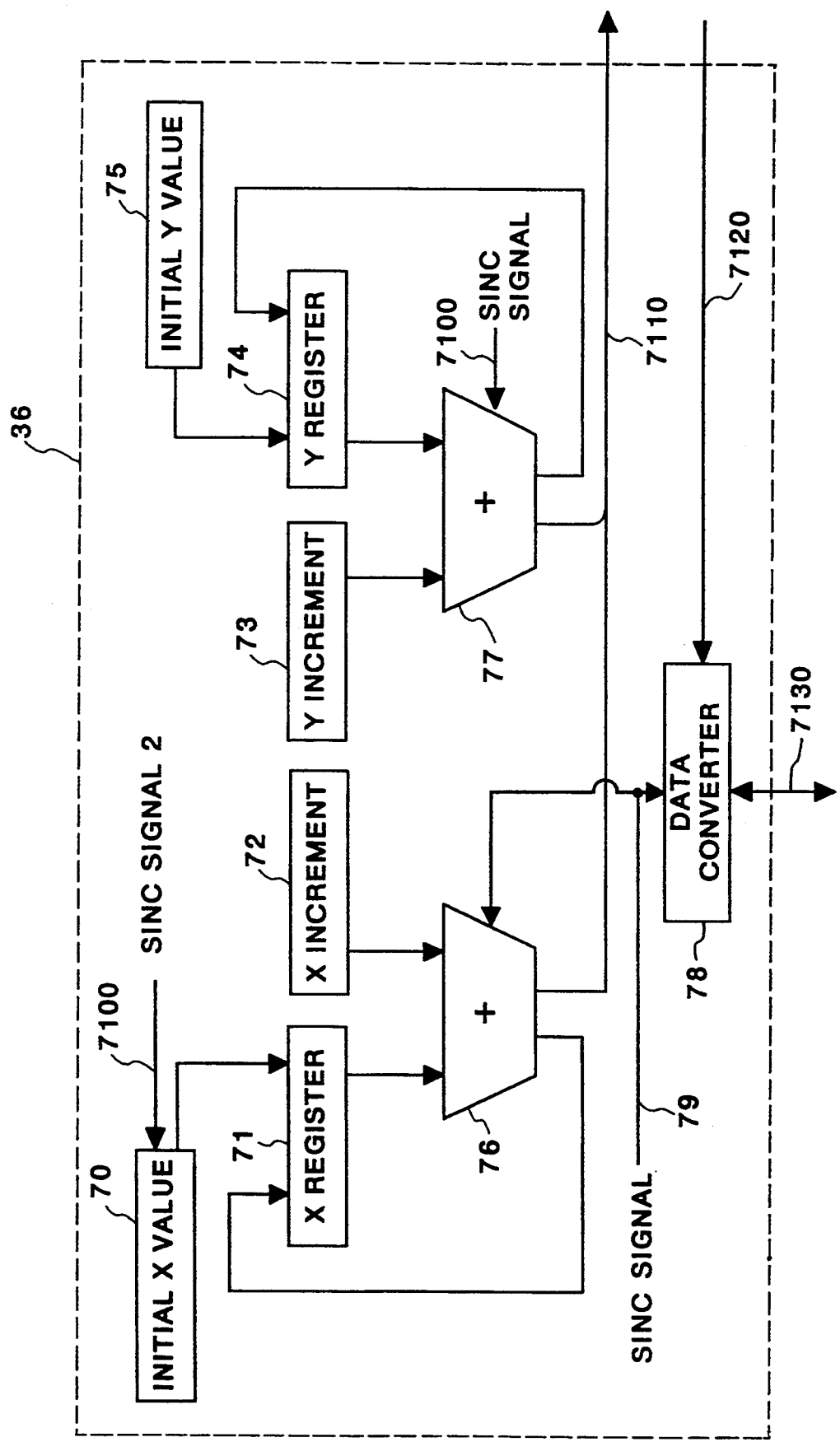
FIG. 7 is a circuit diagram relating a portion of the data converter section for image magnification.

FIG. 7 shows blocks of the data conversion section 36 of this embodiment relating to this process. An initial X value register 70 stores an X-direction read start address of the image memory 33 when printing image data is supplied to the output section 35. An initial Y value register 75 stores a Y-direction read start address of the memory 33. These registers store values obtained by the above-described calculation method. Increment registers 72 and 73 respectively store inverses of the magnifications in the x- and y-directions designated through the operating section 32. In this example, both the registers 72 and 73 store "0.5". Adders 72 and 73 add increment values, i.e., values stored in the increment registers 72 and 73 to the values output from an X register 71 (having initial value equal to the value of the initial X value register 70) and a Y register 74 (having initial value equal to the value of the initial Y value register 75) based on respective sync signals 79 and 7100. The composite data obtained from the results of these additions is output as an address signal 7100, while the respective addition results are written into the registers 71 and 74.

Figure 6:
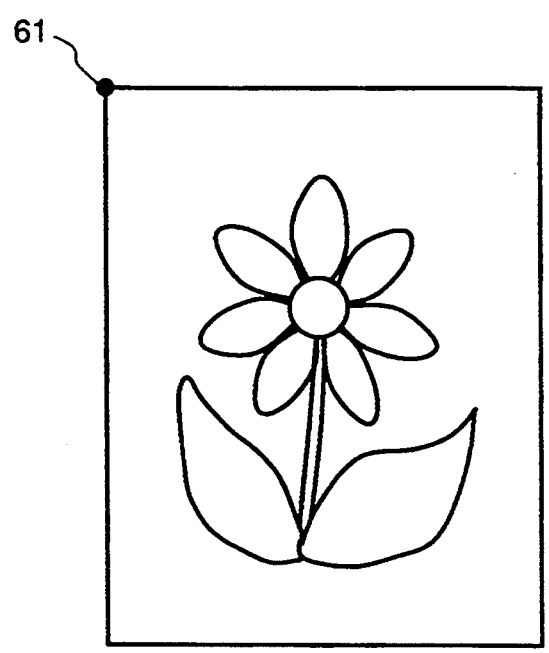
FIG. 6 is a diagram of an example of an image processed by enlargement editing.

In this example, "100" is set in the initial X value register 70 while "75" is set in the initial Y value register 75, and "0.5" is set in both the X increment register 72 and the Y increment register 73. Then the X register 71 outputs "100, 100.5, 101.1 . . . " and the Y register 74 outputs "75.0, 75.5, 76.0 . . . ". The image memory 33 is accessed with integer components of the outputs from the X and Y registers 71 and 74 used as an address signal 7110, and the corresponding image data is input into the data converter 78 through a bus 7120 and is supplied to the output section 35 through a bus 7130. This operation is repeated with respect to X-Y pixels represented by the size information in the additional information to obtain data on an enlarged image. In this embodiment, the image data can be extracted from the memory 33 on the reception side from the output start position designated from the transmission terminal, and this extraction is effected with respect to the pixels designated from the transmission terminal, thereby enabling only the desired image data designated from the transmission terminal to be enlarged and to be supplied to the output section 35. The setting of the output start point on the output sheet (change in the data in the initial X value register 70 and the initial Y value register 75) may be effected on the reception side by addressing, or may be effected in such a manner that the output start point is displayed through the display section 38 and the displayed point is changed for setting. FIG. 6 shows an example of an enlarged image output.

As can be easily supposed, where no additional information including position information is supplied, the memory 33 may be scanned from the first by a CPU or the like to calculate the image data start address.

The operation of another embodiment of the present invention will be described below, which embodiment has an auxiliary storage unit 80 (e.g., a hard disk unit) capable of storing several sheets of image data apart from the memory 33. Components of this embodiment other than the auxiliary storage unit 80 are the same as those shown in FIG. 1 and they will not be described in detail.

In the first embodiment, in a case where part or the whole of the original is transmitted from the transmission terminal to the reception terminal, it is necessary to clear the memory 33 on the reception side before transmission, since the memory 33 on the reception side can accumulate data on only one original image sheet. To preserve the data stored in the memory 33 at present, an instruction is issued to transfer the image data stored in the memory to the auxiliary storage unit 80 and to maintain the image data in this storage before clearing the memory. A process for this maintenance will be described below.

Figure 11:
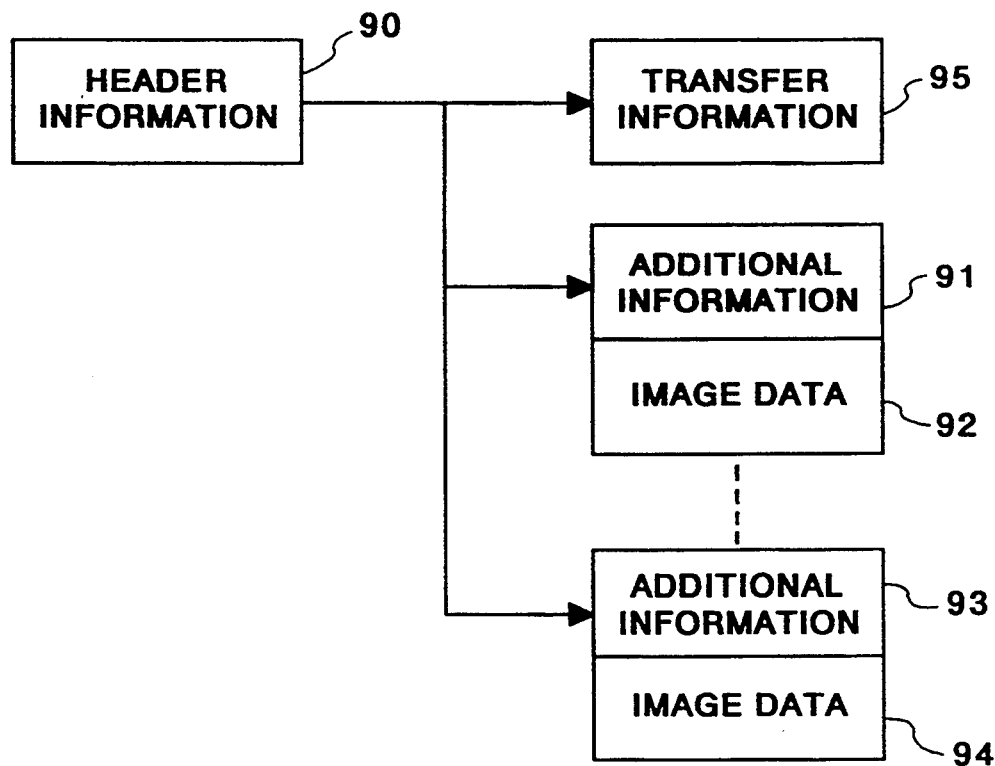
FIG. 11 is a diagram of categories of data stored in an auxiliary storage unit, showing the relationship therebetween.

FIG. 11 shows the structure of data in the auxiliary storage unit 80. A header information field 90 is used for management of information on the addresses and the sizes of transfer information, additional information and image data groups in the auxiliary storage unit 80. Transmission side information, i.e., information for identifying transmitting terminals including the transmission times, the names of companies, telephone numbers is retained in a transfer information field 95. Image data is retained in fields 92 and 94, and additional information added on the transmission side when the image data to be stored in the fields 92 and 94 is transmitted is retained in fields 91 and 93. The control section 31 prepares the header information and the transfer information, and transfers the image data and the additional information from the memory 33 to the auxiliary storage unit 80.

If the available capacity of the auxiliary storage unit 80 is insufficient, the data in the storage is successively erased from the oldest data by referring to the time information of each data group in the transfer information field to enable maintenance of new data.

An operation in which the operator on the reception side extracts and reuses image data thus transferred to and maintained in the auxiliary storage unit 80 will be described below.

Figure 12:
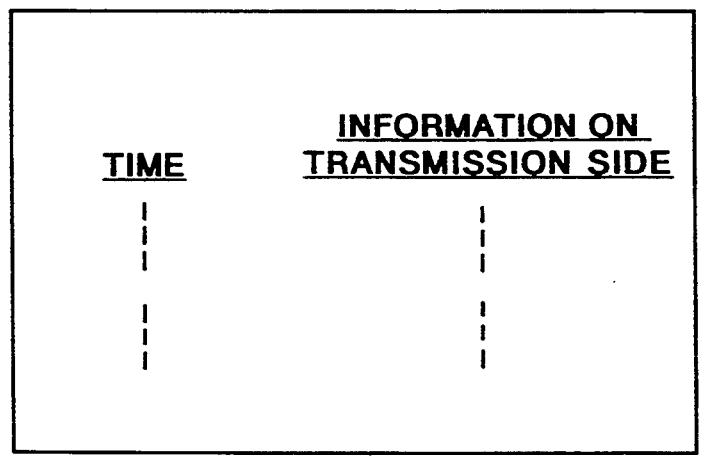
FIG. 12 is a diagram showing a state of the display screen when the contents of an image table stored in the auxiliary storage unit are displayed.

The operator operates the operating section 32 to extract the desired image data from the auxiliary storage unit 80. In this event, information in the transfer information field 95 such as that shown in FIG. 12 is displayed on the monitor 1325 of the operating section 32 to show the time relating to each image data group as well as information on transmission terminals. To select the image data, the corresponding item is designated on the display 38 by means of a cursor or the like. To read the image data thereby selected to the memory 33, the main control section 31 accesses and reads the image data from the auxiliary storage unit 80 according to the data structure shown in FIG. 11, develops the image data in the memory 33 as in the case of reception, edits the data if necessary, and thereafter supplies the data to the output section 35.

In a case where the corresponding image data is erased and/or transmitted to another image processing system, the operating section 32 may also be operated with a displayed image such as that shown in FIG. 12 observed.

Where image data is transferred to and maintained in the auxiliary storage unit 80, the image data may be stored in such a manner as to be compressed before being stored and to be expanded and restored to the original state when read to the memory 33 again, thereby improving the memory utilization efficiency.

If the capacity of the auxiliary storage unit 80 is sufficiently large, the whole image data in one memory may be transferred to and maintained in the auxiliary storage unit instead of image data on a portion of the original sent from the transmission terminal.

The main control section 31 may be provided with a means for observing the state of the communication control section 37 to enable a receiving operation such that when a new "incoming" is detected during transmission, that is, when different transmission (or request for transmission) is started during transmission or reception using the memory 33, the main control section 31 operates to receive and directly store the data of the newly started transmission in the auxiliary storage unit 80. It is thereby possible to newly start reception during reception or transmission presently continued.

In the above-described editing process, only a selected portion of an original image formed on one sheet is transmitted to the destination. However, the present invention is not limited to this process. Still another embodiment of the present invention in which selected portions of a plurality of originals are combined and transmitted will be described below.

Figure 13:
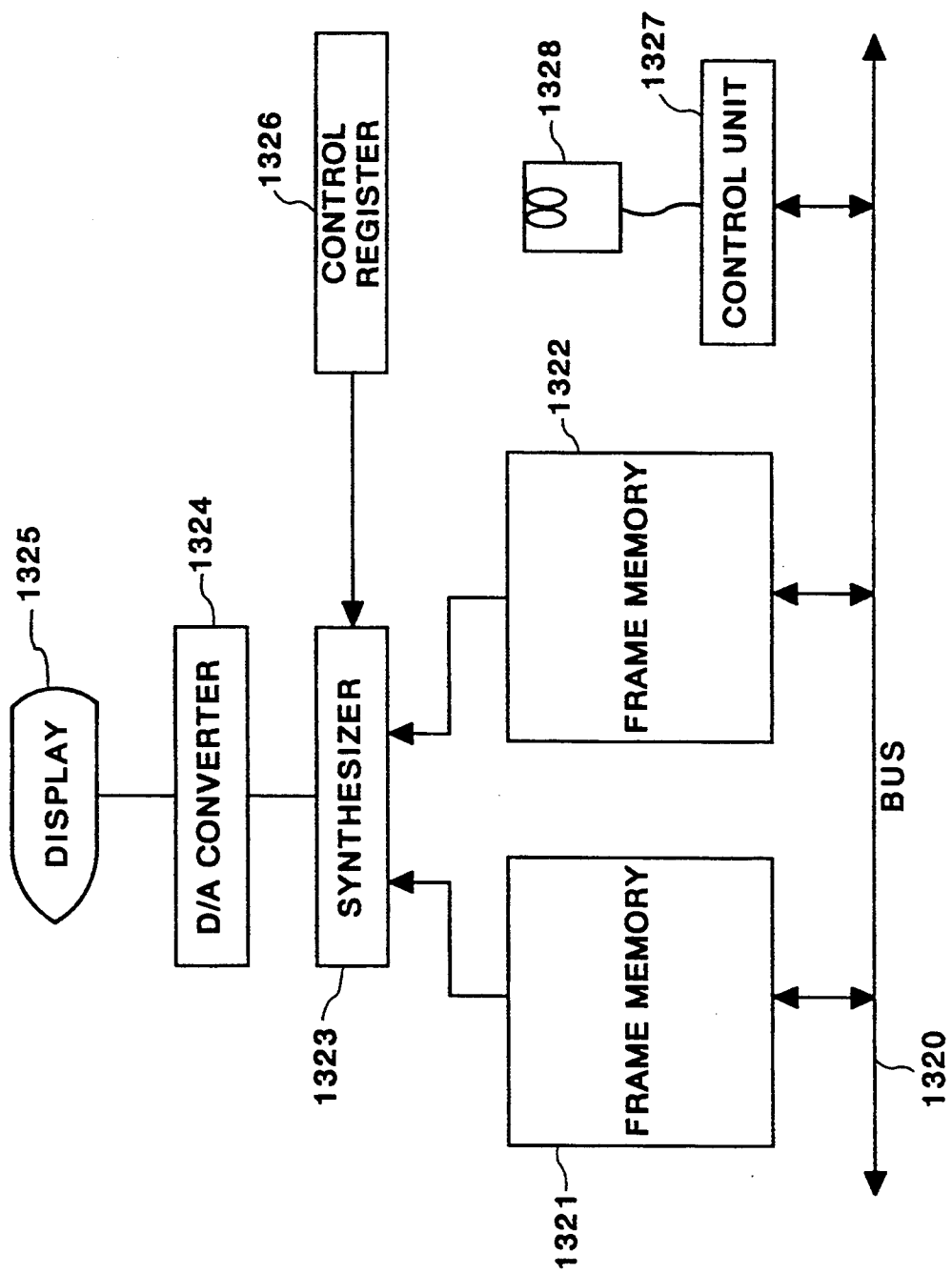
FIG. 13 is a diagram of the construction of an operating section for realizing image synthesis processing.

FIG. 13 shows blocks of the operating section 32 arranged for this process.

Frame memories 1321 and 1322 are provided in which image data for display through the display device 1325 is stored. Image data developed in the frame memories 1321 and 1322 is processed by a synthesizer 1323 and a D/A converter 24 to be converted into data for display through the display device 1325. A mouse 1328 is provided as a pointing device, and a control unit 1327 controls the mouse 1328. A control register 1326 stores data for controlling the synthesizer 1323. Values stored in the register 1326 are controlled by the main control section 31 shown in FIG. 1 or 8. A system bus which connects these devices is connected to the main control section 31. Basically, the synthesizer 1323 serves to select one of image data groups from the frame memories 1321 and 1322 or to select both these data groups and output the result of logical sum thereof. The synthesizer 1321 can therefore be constructed by using several logic gates. In a case where only a certain region of the frame of the frame memory 1321 is displayed while the image of the frame memory 1322 is displayed for the other region, a memory may be provided which stores, for one frame, a signal for designating the image to be displayed (which signal may be of 1 bit), data in one of the two memories may be selected based on this signal to be supplied to the D/A converter 1324.

Figure 14A:
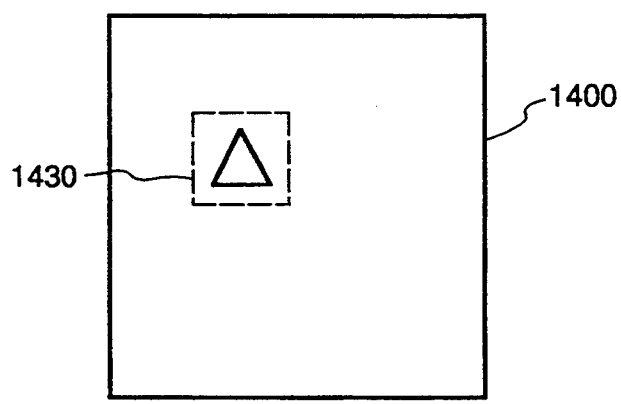
FIGS. 14A to 14C are diagrams showing a procedure of image synthesis.
Figure 14B:
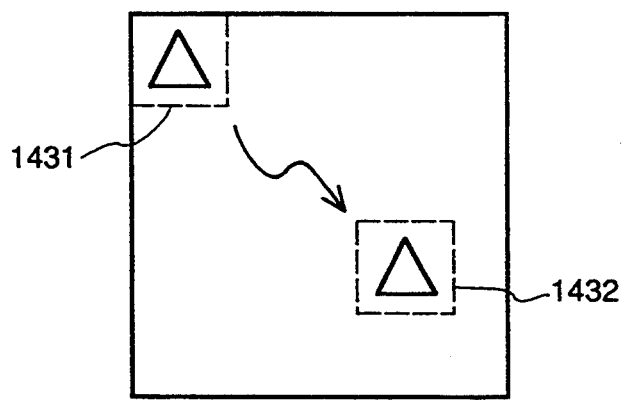
Figure 14C:
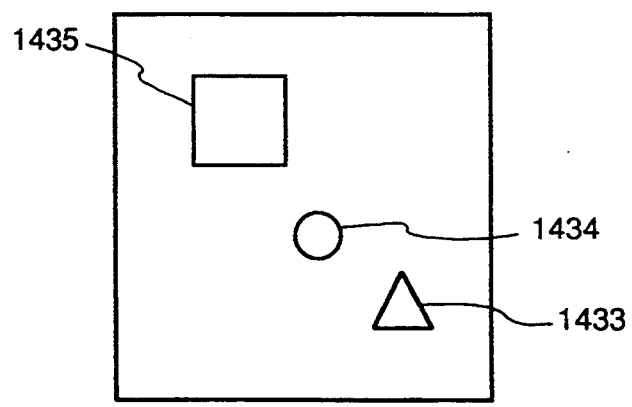
Figure 16:
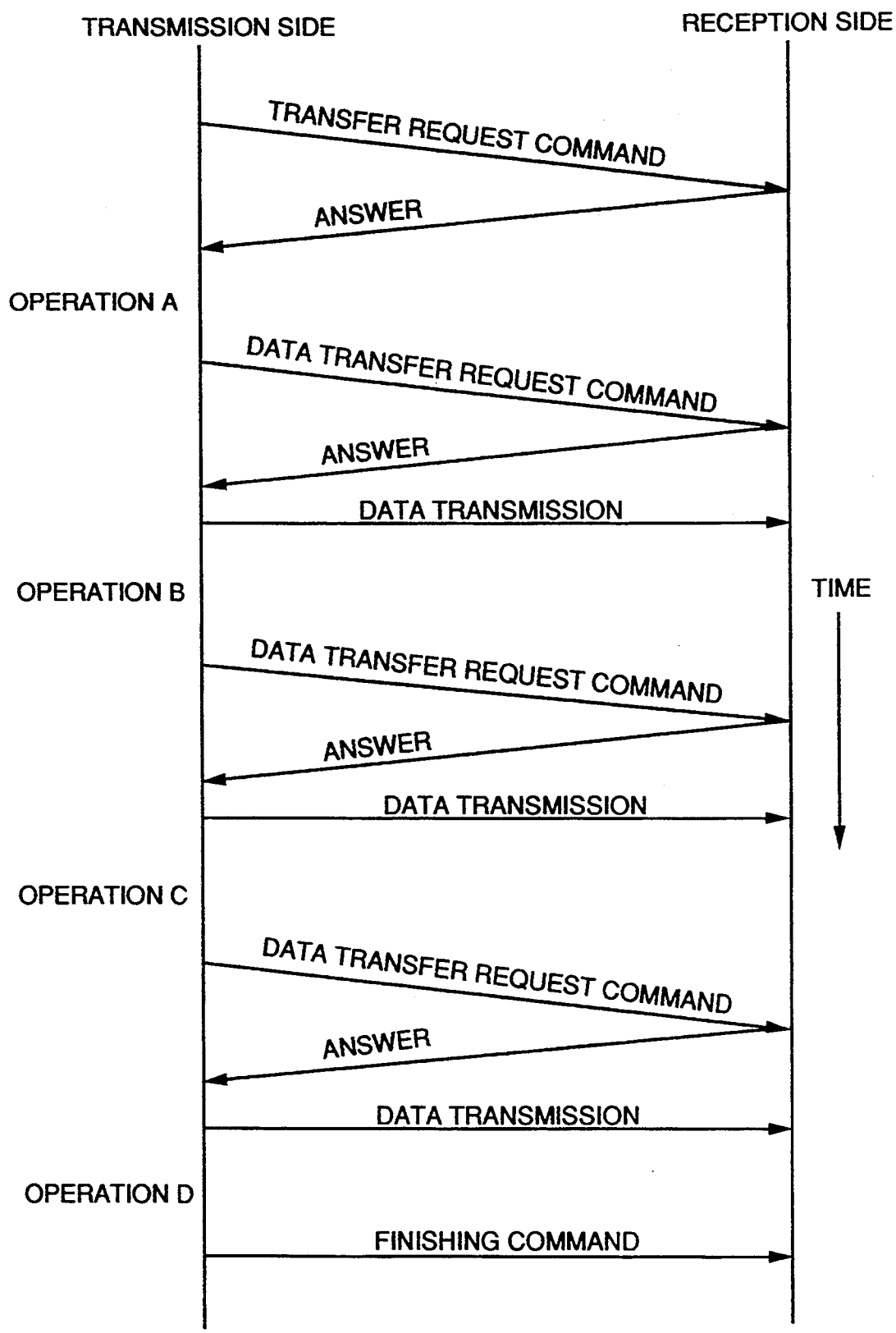
FIG. 16 is a diagram showing kinds of commands transmitted to or received from the destination system with respect to time in accordance with the process shown in FIG. 15.

The editing operation of this embodiment will be described below with reference to the flow chart of FIG. 15 and the diagram of FIG. 16 showing a sequence of communication commands. In step S1, for a pre-processing, a reception request command such as that shown in FIG. 5 is designated by using the pointing device 1328 and is sent to the system on the reception side (destination system), and an answer to this command is waited for. Thereafter, the frame memory 1332 is cleared and the process proceeds to step S2. In step S2, the reading section 34 is activated to read an original. Image data output from the reading section 34 is converted into groups of 8-bit data items for display of red, green and blue which are stored in the image memory 33. The processing of the data conversion section 36 may be omitted in some cases. After one original image sheet has been read, the data is transferred from the memory 33 to the frame memory 1321 in the operating section 32. At this time, the data is transferred in accordance with a certain reduction rate, because the resolution determined by the number of read pixels is ordinarily larger than that of the display. It is thereby possible to see the whole region of the read image data at a time. To transmit the image while reducing the same, the arrangement shown in FIG. 7 may be used. The description for this operation will not be repeated. After the read image has been developed in the frame memory 1321 in this manner, data is set in the control register 1326 to make the synthesizer 1323 use only the frame memory for display and to be confirmed by the operator. In step S4, a region of the read image data to be transmitted is designated by using the pointing device 1328. The designated region is, for example, such as a region 1430 surrounded by the broken line in FIG. 14A. In FIG. 14A, the region 1440 corresponds to the whole image. If the selection of the region 1430 is confirmed, the position on the destination side is then designated. If the selection of the region is not suitable, the operator can use undo-processing and then designate the region again. To designate the position on the destination side, the data in the frame memory or the data set to the control register 1326 is rewritten to display only the extracted region, and the pointing device 1328 is operated for scrolling so as to set the region 1430 stored in the frame memory 1321 to a position 1431 indicated in FIG. 14B. The display is controlled so that the frame of the frame memory 1322 is displayed except for the region 1431. The scrolling is intended to avoid obstruction to the confirmation of the output positions of some partial images which may be previously extracted from other images. Thereafter, the pointing device 1328 is operated to designate a movement of the image 1431 to a position selected by the operator, e.g., a position 1432 indicated in FIG. 14B, and the image 1431 is displayed at the position 1432 by scrolling the frame memory 1321 in accordance with the displacement of the pointing device 1328. The operating section is controlled so that this operation can be performed in a dialogical manner by using the mouse, viewing the display 1325 and, in some cases, selecting icons shown on the display 1325. After the position on the destination side has been determined, judgment is made to determine whether or not the next image is read. In a case where another image is read, a data transfer request command is transferred to the transmission destination system in order to output the image of the region presently designated, and an answer from the destination is waited for. In step S8, the data on the image actually cut out is transferred. The transferred data is not the data on the partial image left in the frame memory 1321 but the data in the image memory 33 of the system. That is, since the position and the size of the partial image cut out by the operator on the display screen and the reduction rate at the time of transfer from the image memory 33 to the frame memory 1321 are known, the actual cutout position and the size as defined in the image memory 33 are calculated back based on these factors. The information on the partial image in the image memory and the output position information are transmitted to the destination system through the communication section 37. Simultaneously (or before or after this transmission), the partial image data within the designated region of the display image data stored in the frame memory 1321 is transferred to the corresponding position in the frame memory 1322. The image to be output and printed by the destination system is prepared in the frame memory 1322. In a case where a plurality of originals are combined to be transmitted, the steps from reading to image data transmission may be repeated. FIG. 14C shows an example of synthesis of image data 1433 to 1435 in three originals.

After partial images to be combined on one sheet have been transmitted in this manner, a transmission finishing command is transferred to the destination system to terminate the transmission process. FIG. 16 shows a sequence of command/data transfer between the transmitting and receiving systems. Each of operations A to D on the transmission side performed by the operator with the transmitting system includes reading an original and designating the image position on the destination.

In the system on the destination side, each command transferred from the system on the transmission side is interpreted and the designated operation is executed to write the received partial image data into the image memory 33 on the reception side in a position such that the partial image data can be output to the designated position. When a final finishing command is received, image data which has been received is sent from the memory to the printer section to be output. If the operator wishes to edit the image, he may input an instruction for editing and stop printing.

In the above-described example, the image memory has a capacity corresponding to one page. If the memory has a capacity for a plurality of pages, the system operates to conduct a process described below. In the following description, the process is explained with respect the difference from the above example.

The steps of reading an original and designating the position on the transmission side after the input of the edit instruction from the operator are the same as the above example. In the above example, each time the output position of a partial image is determined, the corresponding partial image is transmitted. In this process, partial images to be transmitted may be successively transferred to and maintained in different pages of the image memory 33 of the system on the transmission side, since the memory is capable of storing data on a plurality of original image sheets. When one complete image to be transmitted is prepared, transmission is started.

The process will be described below briefly.

Figure 17:
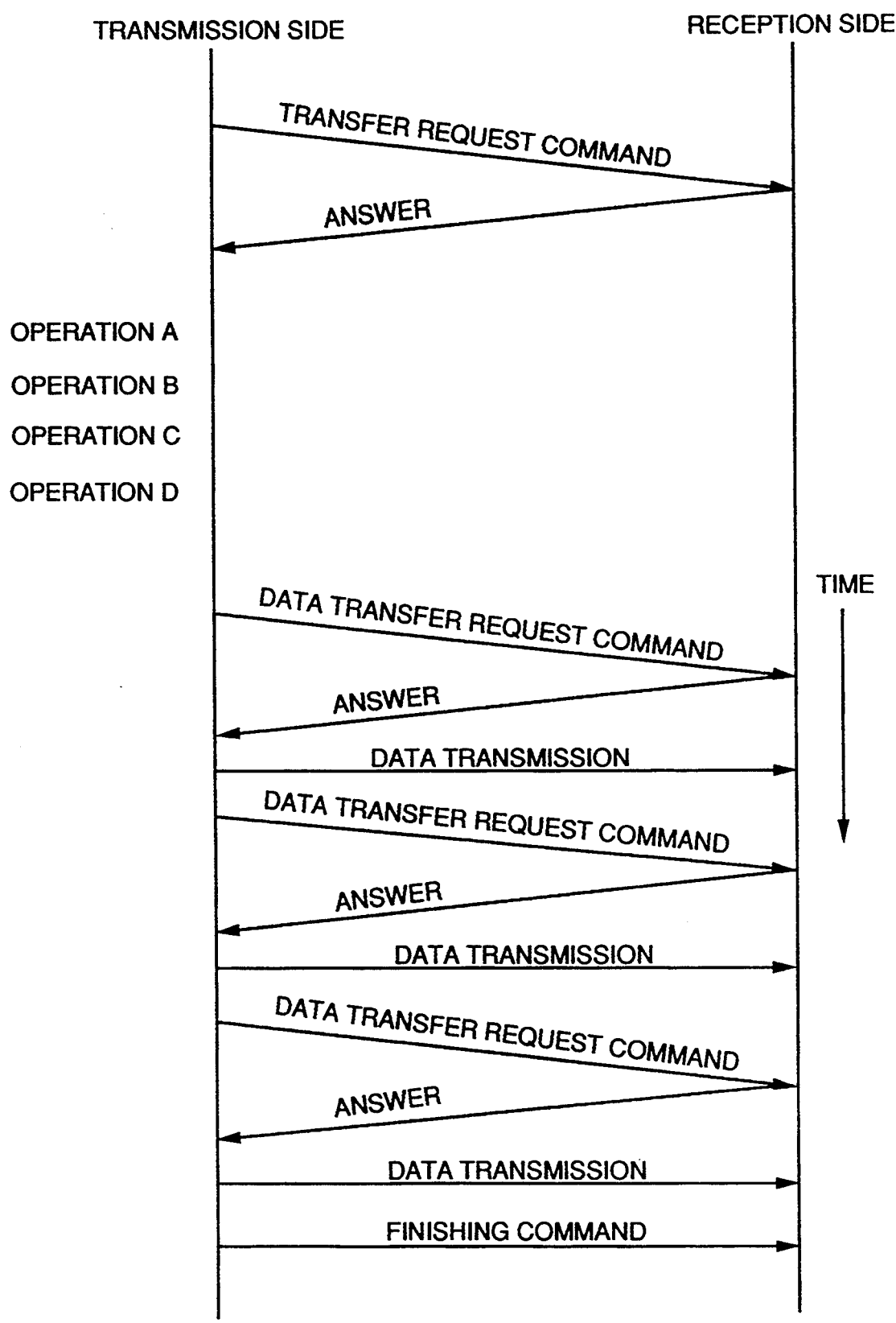
FIG. 17 is a diagram showing kinds of commands transmitted to or received from the destination system with respect to time in a case where a combined image is transmitted by using an image memory capable of storing a plurality of sheets of original image.

Designated partial image data of the display image data stored in the frame memory 1321 is transferred to the corresponding position in the frame memory 1322 as in the case of the above example. An image to be output on the reception side is thereby prepared in the frame memory 1322. When the end of image preparation is selected by the operator, region size information and output position information relating to the maintained image data is sent in the designated order, and a step of transmitting actual image data is repeated for a number of sheets combined by the operator. FIG. 17 shows a sequence of command/image data transfer between the transmitting and receiving systems.

Where the image memory 33 has a memory capacity for a plurality of image sheets, all partial images combined can be maintained as actual data in the image memory 33 of the system, thereby enabling undo-processing for changing the output position and so on.

The sequence of command/image data transfer between the transmitting and receiving systems is not limited to that shown in FIG. 16 to 17.

The number of image sheets which can be combined in the frame memory through the display device of the operating section 32 is not limited to two. If two or more sheets can be combined, it is not necessary to transfer determined display image data to the frame memory 1322, and images stored in the respective frame memories may be directly combined and displayed.

If the image memory 33 has a memory capacity for a plurality of image sheets, the operational conditions are improved.

Figure 18:
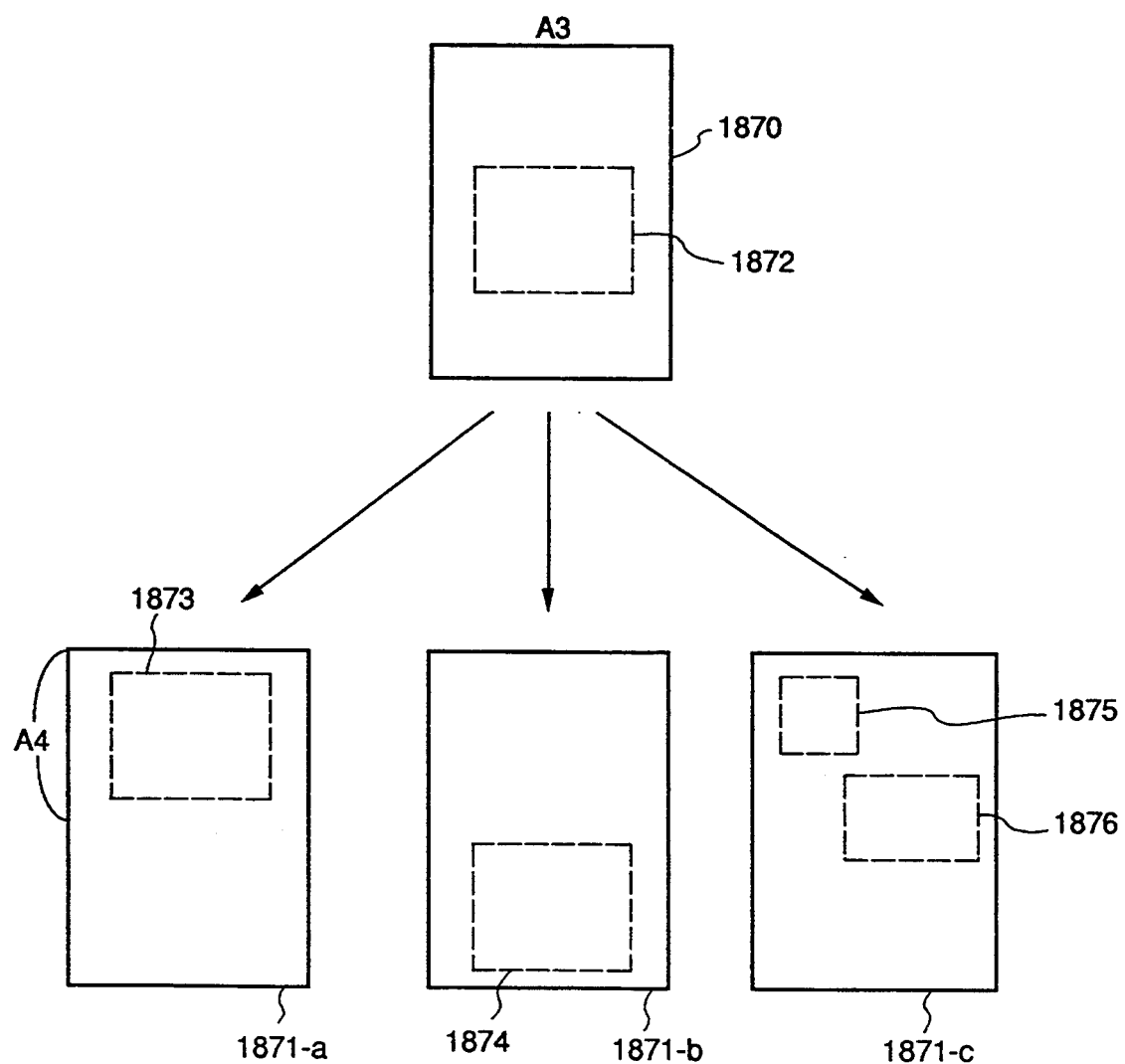
FIG. 18 is a diagram of a process of selecting a recording medium according to the size of the received image and the position of the same.

The control of the selection of an output sheet in the system on the reception side in a case where the size of an image transferred from the system on the transmission side is different from the size of the original will be described below. As mentioned above, recording sheets having A3 and A4 sizes can be used in the output section 35 of the embodiments. To simplify the description, a process in which a partial region of an A3 original to be transferred is designated on the transmission side and is transmitted to the reception terminal will be explained below with reference to FIG. 18. The process will be described with respect to a case where the operator designates a rectangular region 1872 of an A3 original surrounded by the broken line as a partial image region to be transmitted, and sets the output position on the output sheet to a region 873 surrounded by the broken line in an area 1871-a. The system on the reception side receiving this image data determined whether or not the region 1873 can be output to an A4 sheet. In a case where the A3 size original is processed with a scanner printer having a resolution of 16 dots/mm, an A3 size sheet includes 4752×6720 pixels while an A4 size sheet includes 4752×3360 pixels. It is possible for the main control section to determine whether or not the selected region can be set within the region of A4 size (4752×3360 pixels) from the output start address of the region 1873 and the size of the transfer region. If the main control section determines that printing in the A4 area is possible, it outputs a control signal as signal SRCOM516 to select an A4 size output sheet, and outputs an image in the upper half region of the area 1871-a. In a case where the image region is transferred to a region 1874 of an area 1871-b, the control section selects an A3 size output sheet. In a case where a combination of plurality of partial images is output as indicated in an area 1871-c, it is necessary to discriminate whether the whole of the output image is of A3 or A4 size. In this case also, respective regions 1875 and 1876 are transferred from the system on the transmission side. Sheets may be selected based on the output position addresses and the sizes of the respective regions, and the maximum size of these sheets may be selected as the output sheet size.

As described above, the desired image can be output on the sheet selected based on the transferred size and position of the image while the unnecessary marginal area of the sheet is minimized.

In this example, the size of the original on the transmission side is A3 and a A3 or A4 sheet is selected on the reception side. However, the output sheet selection in accordance with the present invention is not limited to this. For example, it is possible to combine a plurality of A4 size originals on the transmission side and outputs the combined image to an A3 size sheet.

Needless to say, the sheet sizes may be selected from a plurality of types including or apart from A3 and/or A4.

As described above, an image data transmitting-/receiving system having a display device and a pointing device is constructed and the transfer region and the output position are designated from the unit on the transmission side, thereby making it possible to directly prepare an output image in an interactive manner on the transmission side.

If the image storage memory of the system on the transmission side has a capacity for a plurality of image sheets, the facility with which the editing operation is performed is improved, thereby reducing the time for exclusive use of the line between the transmitting and receiving systems. In the system on the reception side, an output sheet having an optimum size for outputting an image is selected based on the size and the output position of image data sent from the transmission terminal, thereby making possible to obtain an output image while minimizing unnecessary marginal area.

A further embodiment of the present invention will be described below.

Figure 19:
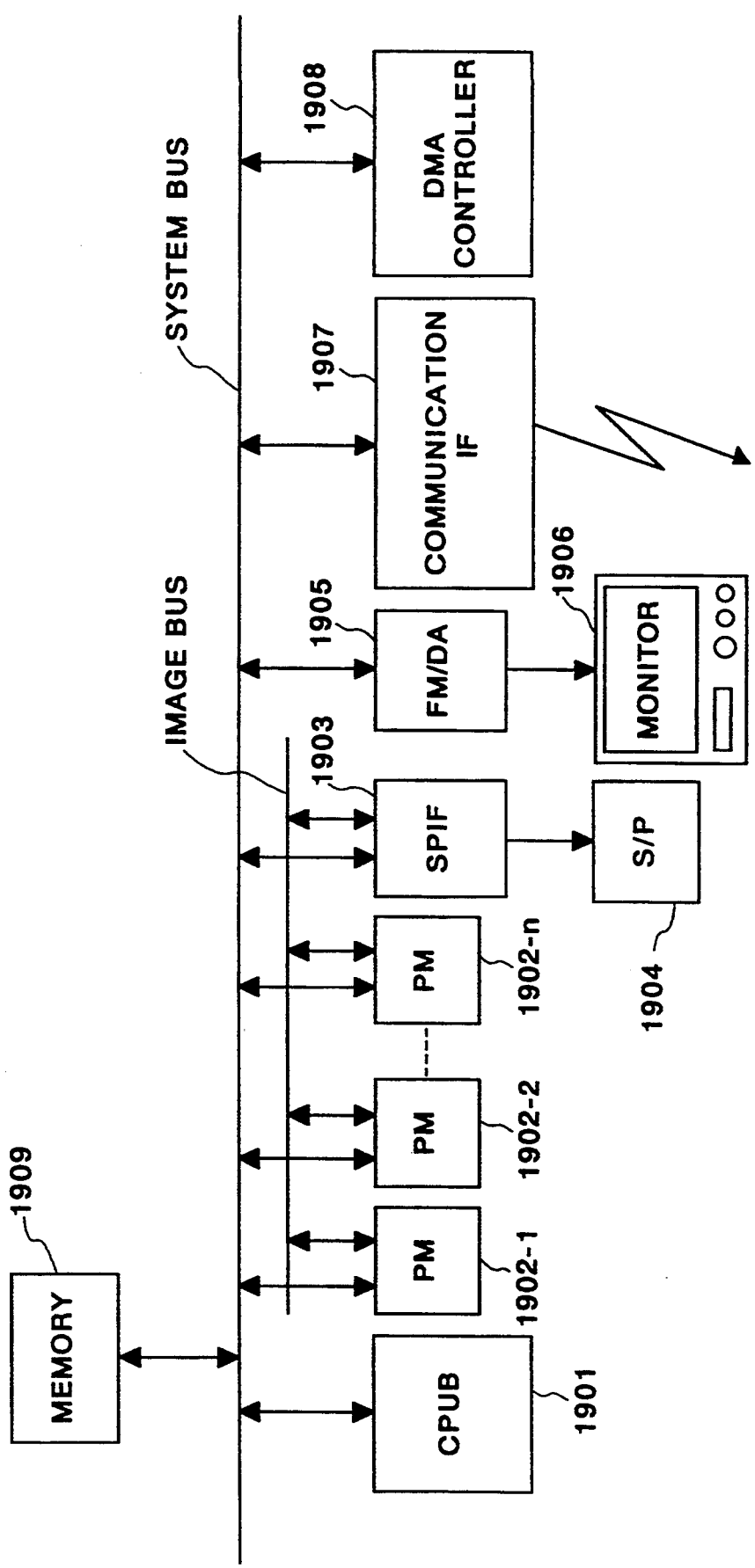
FIG. 19 is a schematic diagram of the construction of an image processing system which represents still another embodiment of the present invention.

FIG. 19 shows the construction of this embodiment.

Figure 22:
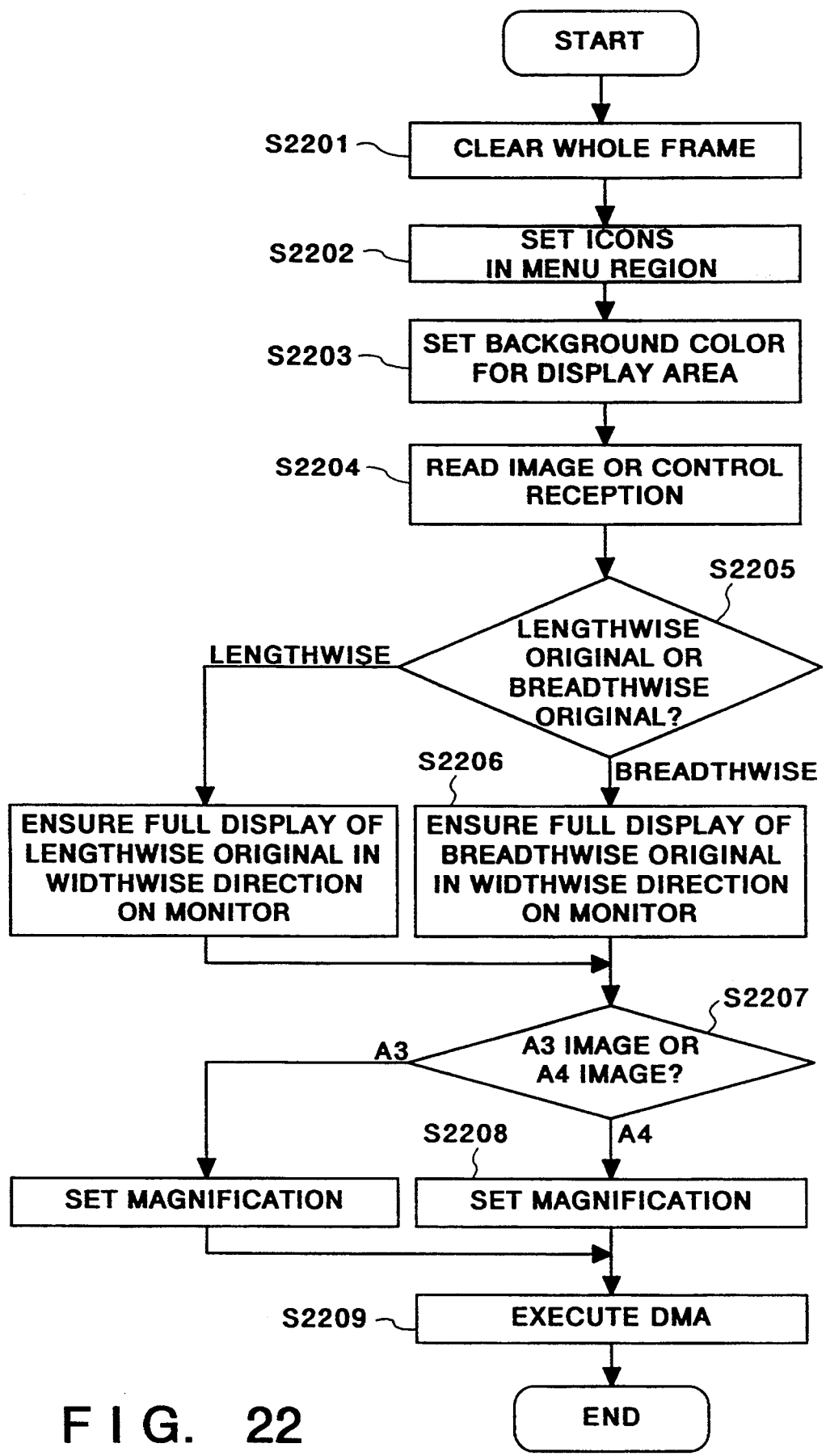
FIG. 22 is a flow chart of a process of displaying an image in an optimum state.
Figure 25:
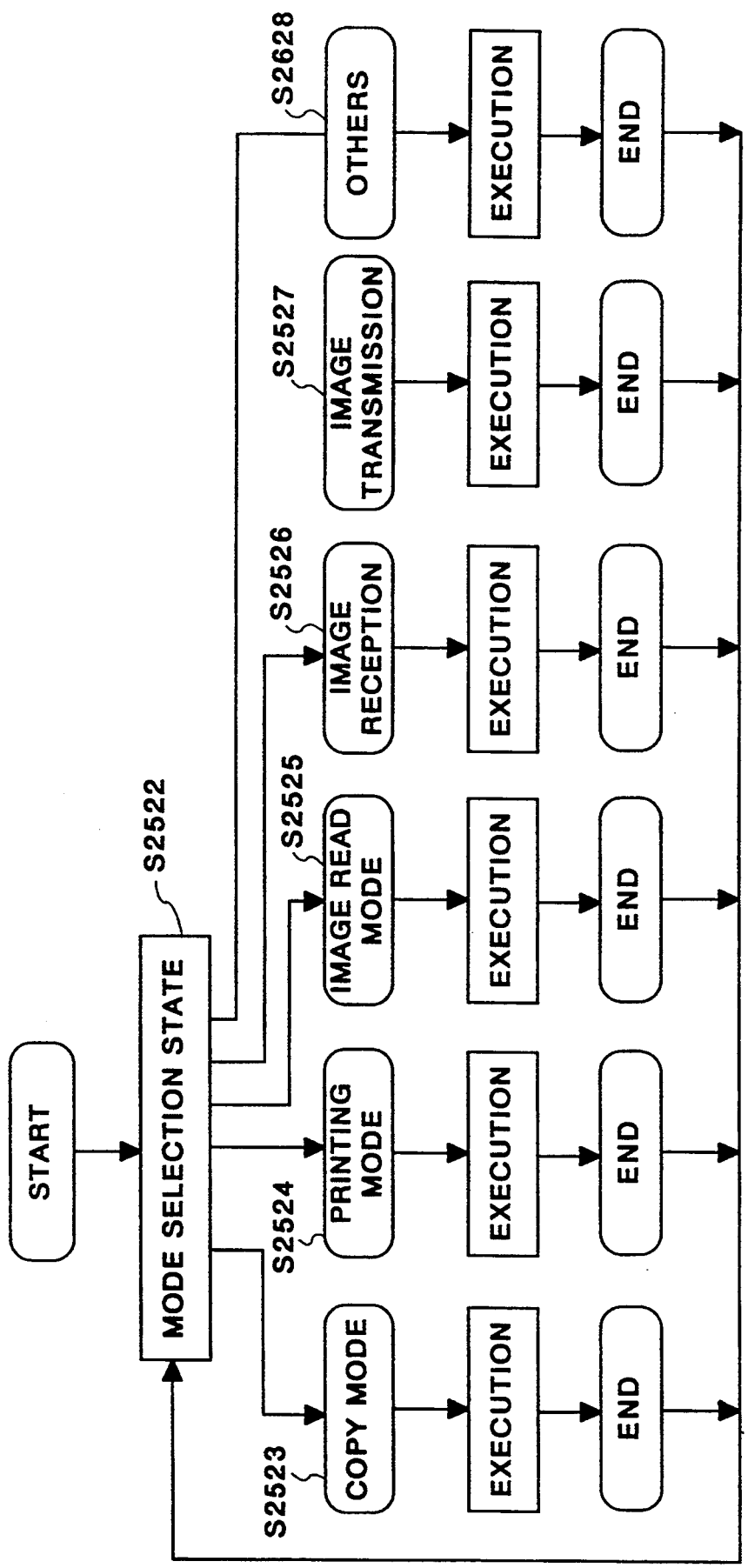
FIG. 25 is a flow chart of the operation of the system.
Figure 27:
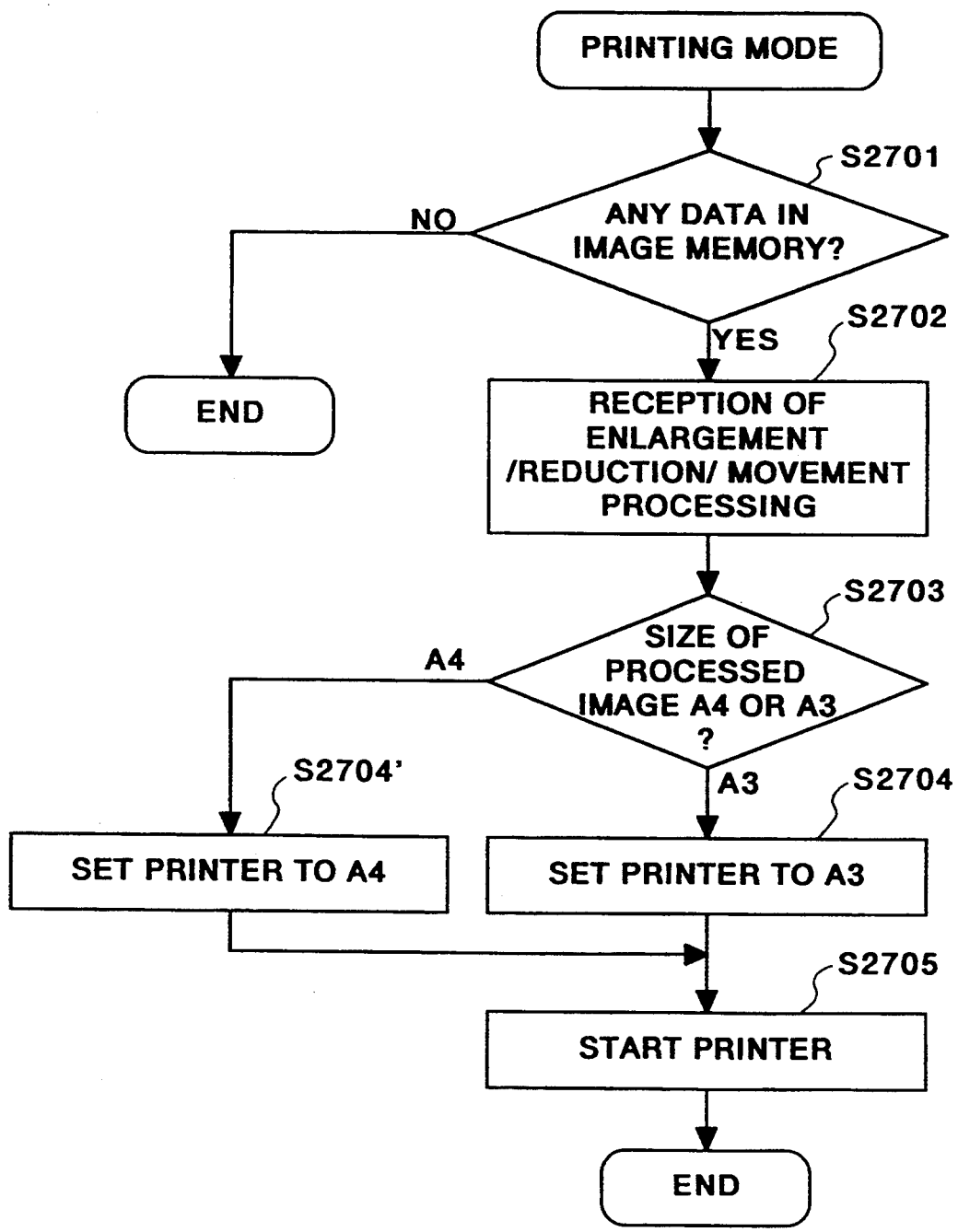
FIG. 27 is a flow chart of a process of printing an edited image on a recording medium having an optimum size.

A CPU board 1901 for overall control of the system and controls the following components based on a processing procedures such as those shown in FIGS. 22, 25, and 27 read from a control memory 1909.

An image memory 1902 (corresponding to the image memory 33 of the above-described embodiments) for storing image data includes page memories PM1902-1 to PM1902-n. In this embodiment, data for one color can be stored in each of the page memories PM1902-1 to PM1902-n. A scanner or printer S/P 1904 is connected to the image memory 1902 through a scanner/printer interface SPIF1903. The S/P 1904 corresponds to the reading section 34 and the output section 35 of the above-described embodiments. For the following description, it is assumed that the S/P 1904 is constructed as shown in FIGS. 9A and 9B. The image memory 1902 may store the result of transmission or reception of image data through a communication interface 1907.

Image data stored in the image memory 1902 is directly transferred to a frame memory FM/DA converter 1905 through a DMA (direct memory access) controller 1908. The FM/DA 1905 includes a frame memory FM and a D/A (digital/analog) converter for displaying an image through a monitor device 1906 based on data stored in the frame memory FM.

Ordinarily, data is stored in the image memory 1902 in the following three modes:

(1) an image read mode in which an image is temporarily read to the image memory PM1902 through the interface SPIF1903 by means of the color scanner 101 of the S/P 1904;

(2) a copying mode in which an image is output to the printer section 102 of the S/P 1904 through the interface SPIF1903 subsequently to reading the image, as in the case of the image read mode; and (3) a mode in which an image is received into the image memory 1902 from another system through the communication interface 1907 by image data communication.

The system of this embodiment has a printing mode in which if the memory PM1902 has an image supplied in one of the above modes, the image data in the memory PM1902 is output to the printer of the S/P 1904 through the scanner/printer interface SPIF1903.

Referring to FIG. 25 which is a flow chart of a control process in accordance with this embodiment, after the system has been activated, the CPU board CPUB1901 operates the DMA controller 1908 to read out the content of an icon data ROM (ROM 2116 mentioned later) provided in the DMA controller 1908 and to directly write the data stored in this ROM into the FM/DA 1905 having the frame memory for monitor display. Displayed icons are used to designate each of operational modes, and the operator can select each operational mode by using a pointing device such as a mouse. The process proceeds to a mode selection state 2522 shown in FIG. 25. Mode selection is thereby effected to execute procedure in copying mode 2523, printing mode 2524, image read mode 2526, image transmission mode 2527 or one of other modes. After the operation in each mode has been completed, the process returns to the mode selection sate 2522. To receive image data from another system, the procedure in image reception mode 2526 is executed in the same manner.

If in this system there is no image data in the image memory to be output, the icon for selecting the printing mode is displayed. That is, when the operation of the system is started, a printing mode enable flag (not shown) is set to the inhibition state to inhibit the icon for selecting the printing mode to be displayed during the mode selection state 2522. When the procedure in copying mode 2523, image read mode 2525 or image reception mode 2526 is executed, data is stored in the image memory 1902, and the printing mode enable flag is set to the enable state. In image transmission mode 2527, data is temporarily stored in the image memory 1902, but the printing mode enable flag may be set to the inhibition state to inhibit setting of the printing mode in order to prevent leakage of secret information through the transmission image even through an unauthorized person operates the system. In this case, the printing mode enable flag may be always referred to during the mode selection state 2522 to control the system depending upon whether or not the icon for printing mode execution is displayed.

Alternatively, the icon for printing mode execution may be always displayed. In this case, the printing mode enable flag is referred to when the printing mode 2524 is selected, and, if the flag is set to the inhibition state, the execution may be cancelled and the process may proceed to the end without any processing, or a message such as "there is no image to be printed" may be displayed when the printing mode execution icon is selected. Also, the process may be returned to the start of the routine of the mode selection state 2522.

An example of the execution of the procedure in the printing mode will be described below with reference to FIG. 27. In step S2701, judgment is made to determine whether or not data is left in the image memory 1902 or whether or not the data may be output. If NO, the process immediately ends. In the case of a printing enable state, icons for various kinds of image processing, enlargement/reduction processing and image movement are displayed on the monitor 1906 in step S2702 to receive relating instructions. These kinds of processing are performed in steps subsequent to step S2704 in a pipe-line manner, and the processed data is output to the printer section of the S/P 1904. Before execution of these kinds of processing, judgment is made in step S2703 to determine whether the size of the image after processing is A4 or A3, and a necessary minimum sheet size is selected in step S2704. At this time, determination is made as to whether the present mode a printing mode, image reception mode or image read mode, and the sheet size is determined with respect to the image reading size in consideration of the enlargement/reduction rate and the extent of position shift. The sheet size is an optimum one selected from the sizes of sheets prepared in the printer section 102 of the S/P 1904.

The control of enlargement or reduction in the vertical direction is performed in such a manner that vertical direction addresses are thinned out or repeated with respect to each line when the image data is read out of the image memory PM1902 to the scanner/printer interface 1903.

In a case where the procedure previously executed is of the image reception mode, the sheet size is determined based on information on the size of the received image (A4, B5, 2000×1000 pixels . . . ) and so on.

After the sheet size has been determined in this manner, the sheet size is set in the printer section of the S/P 1904 in step S2705 to start printing and complete the process.

Figure 26:
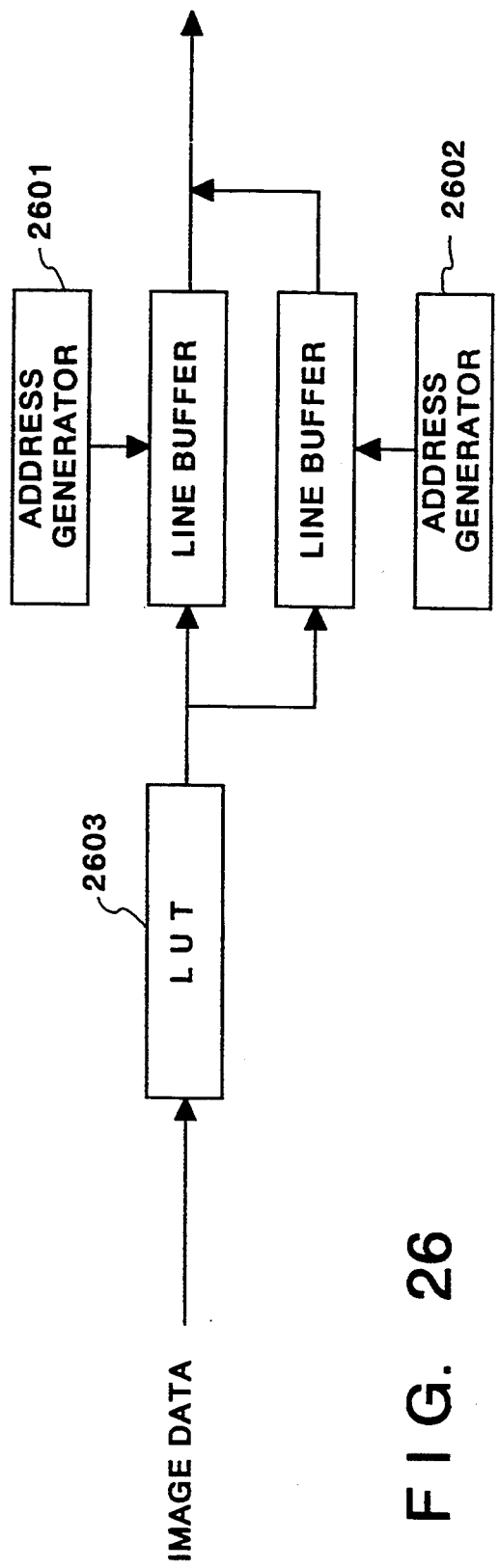
FIG. 26 is a block diagram of an arrangement for realizing pipe-line processing for color conversion and enlargement.

FIG. 26 shows the above-mentioned pipe-line processing in detail. The components shown in FIG. 26 are provided in the SPIF 1903. An LUT (look-up table) 2603 enables processing of gradient conversion or the like. Image data is written alternately into two line buffers with respect to each horizontal line, data being read from one of these line buffers when the other buffer is used for writing.

Addresses supplied to the reading line buffer are generated by address generators 2601 and 2602. The same address may be repeated to enlarge the image, or sequences of addresses may be thinned out for reduction processing. The address may not be reset to "0" each time data for one line is processed but set to a different value to move the image in the horizontal direction. In such a case, the address supplied to the writing line buffer is changed by counting in an ordinary manner such that it is started from "0" and incremented by one with respect to each pixel. In the above process, image data can be processed and output to the printer at a high speed. Pipe-line processing may also be performed for reading the original image with the color scanner 101 and storing the data in the image memory 1902.

As described above, there is no problem when a person operating the system checks whether or not any image exists, or when the operator operates the system without any consideration of the image output size. For printing, the size of printing sheets is always optimized.

The operation of this image display system will be described below with reference to FIG. 22 with respect to a part of a process of controlling image display in image read mode 2525 and in image reception mode 2526 with the CPUB 1901.

Figure 21:
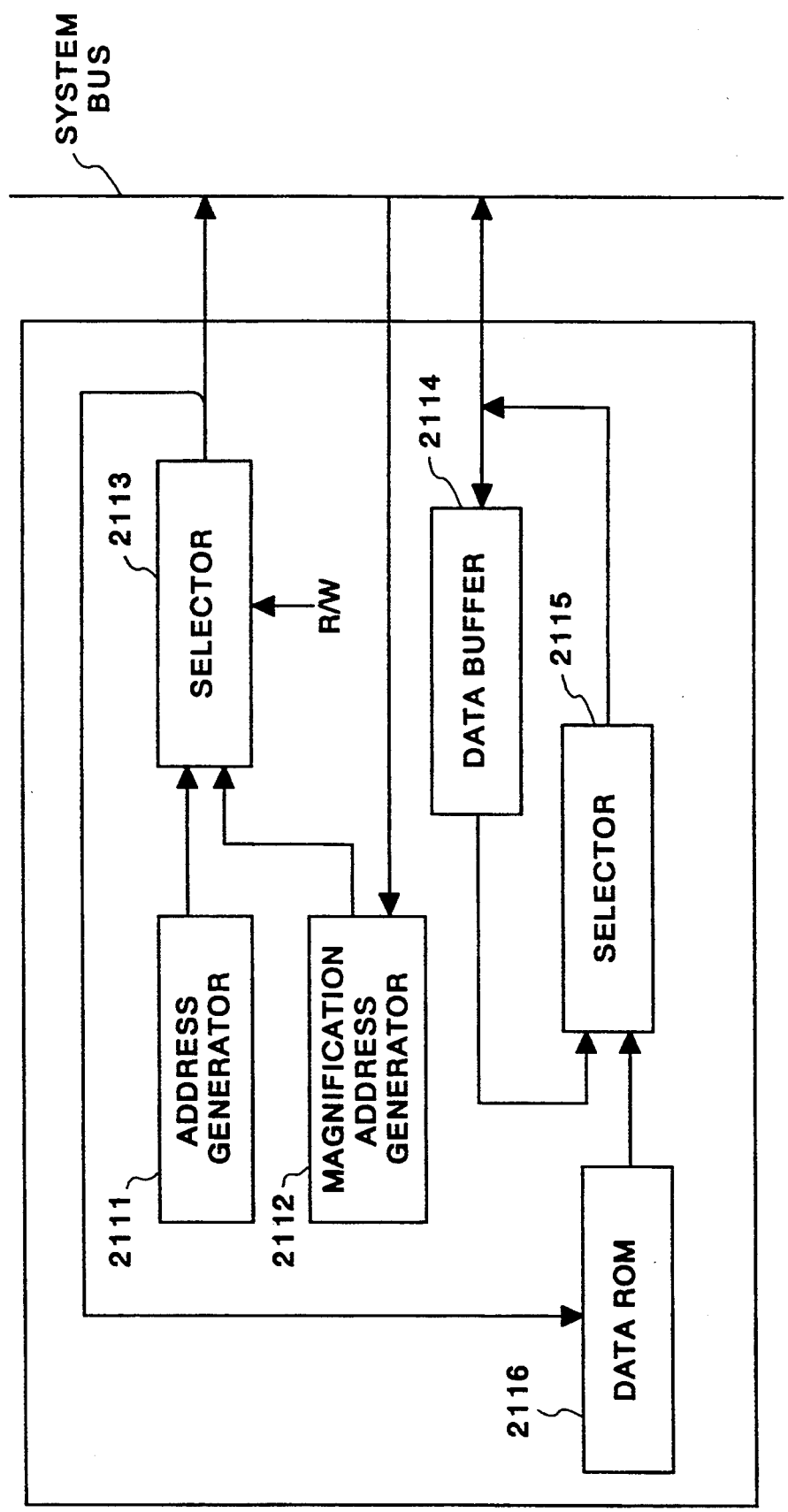
FIG. 21 is diagram of the construction of the DMA controller shown in FIG. 19.

First, in step S2201, the system is initialized to clear all frames. This frame clearing processing will be described below with reference to a diagram of FIG. 21 schematically showing the construction of the DMA controller 1908. The DMA controller 1908 has an image write address generator 2111 and an image read magnification address generator 2112. The address generated by one of these address generators is selected and output by a selector 2113 for image reading or writing. At the time of image reading, an image is temporarily stored in a data buffer 2114. At the time of writing, the content of a data ROM 2116 or the content of the data buffer 2114 is output through a selector 2115.

In step S2201 for frame clearing processing, the DMA controller 1908 accesses the frame memory FM of the FM/DA 1905. At this time, the DMA controller 1908 performs write-only operation to write clear data (FF$_H$ in the case of 8 bits) contained in the ROM 2116 into the frame memory FM.

Figure 20A:
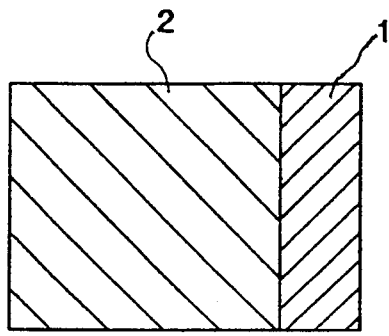
FIGS. 20A to 20D are diagrams showing states of the screen when a read original is displayed.
Figure 20B:
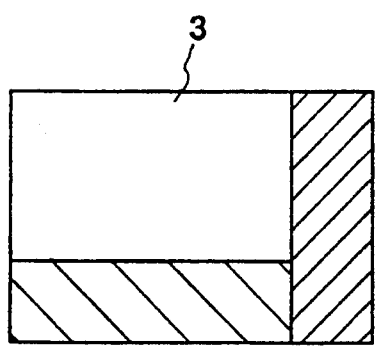
Figure 20C:
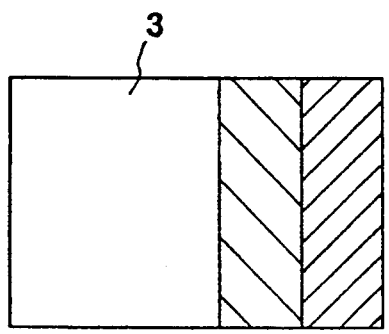
Figure 20D:
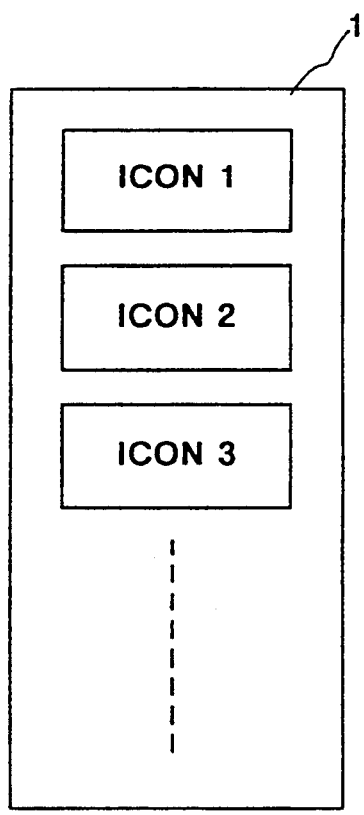

In step S2202, icon patterns such as that shown in FIG. 20D are set in an area 1 of the frame memory FM. This is also effected by the DMA controller 1908. That is, each icon pattern is stored in the data ROM 2116 of the DMA controller 1908. In this case, addresses output from the selector 2113 are used for addressing in the data ROM 2116.

in step S2203, and area 2 shown in FIG. 20A is colored, for example, gray to indicate that an image is displayed in the corresponding area. This is also effected by the DMA controller 1908, as in the case of clearing (S2201).

In step S2204, image transmission from another system or image attributes to be displayed at the time of image reading are recognized. In this process, the operator recognizes whether the original image is lengthwise or breadthwise and whether the image has three or four colors to input these attributes into the system. In a case where the displayed image is a received, image, an erect image can be displayed without intermediation of the operator, if image direction information is transmitted from the transmission terminal along with the image data.

In step S2205, determination is made as to whether or not the original is lengthwise or breadthwise based on the data of the attributes of the image region, and, in steps S2206 and S2206' the display region is set according to the lengthwise or breadthwise form. It is to be noted that data on the image read by the scanner is directly stored in the image memory 1902 while an image obtained by thinning-out this data is displayed in the display screen. That is, since it is desirable to minimize the extent of thinning-out to facilitate the confirmation of the contents of the read image, it is preferable to maximize the size of the image while displaying the whole of the image. Accordingly, the display region in which the image is formed and which is within the area excluding the the area 1 is set as shown in FIG. 20C in the case of an lengthwise original shown in the same figure, or as shown in FIG. 20B in the case of a breadthwise original. Clearing is effected again with the DMA controller 1908 before the image in this region is displayed.

In step S2207, judgment is made to determine whether the size of the displayed image is A3 or A4 based on the attributes data of the image data. In step S2208, magnification is determined according to the size A3 or A4 to set the magnification of the address generator 2112 so that the image fully extends in the image display region, as shown in FIG. 20B or 20C.

If the magnification is 1/R, the magnification address generator 2112 of the DMA controller 1908 increments the address by R and outputs only integer parts of the address values.

It is therefore possible to reduce the size of the image by, at the time of DMA processing, reading the image from the image memory 1902 every other R pixels and successively writing the read data into the frame memory FM so as to form adjacent pixels.

In step S2209, after such 1/R reduction has been set, the FM/DA 1905 is accessed from the image memory 1902 to completely display the image.

Figure 23A:
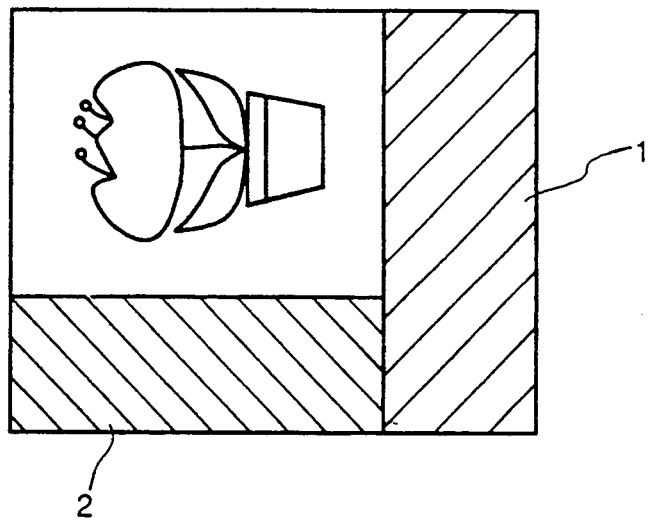
FIGS. 23A and 23B are diagrams of an original image, showing non-erect and erect states of this original, respectively.
Figure 23B:
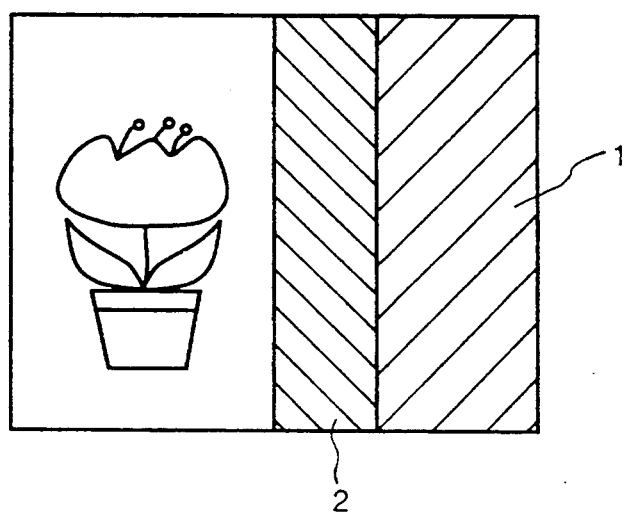

In this process, the lengthwise or breadthwise direction of the displayed image is determined according to a lengthwise or breadthwise size of the original. In some cases, however, there is a need for placing an A4 lengthwise original in a lateral position for image reading with the scanner S/P 1904, as shown in FIG. 23A. In such a case, the lengthwise and the breadthwise directions may be converted when the image data is stored in the image memory 1902 through the SPIF1903. In a case where the operator finds that the lengthwise and the breadthwise directions are reversed after the image has been displayed, the DMA converter 1908 may transfer the data for display while converting the lengthwise and the breadthwise directions. In this event, the DMA controller 1908 may only exchange horizontal direction components X and vertical direction components Y in the addresses of the address generator 2111; there is no need for change in the reduction rate. This lengthwise/breadthwise direction conversion may be set through an icon menu by the operator. It is thereby possible to convert the image to a state shown in FIG. 23B.

Figure 24:
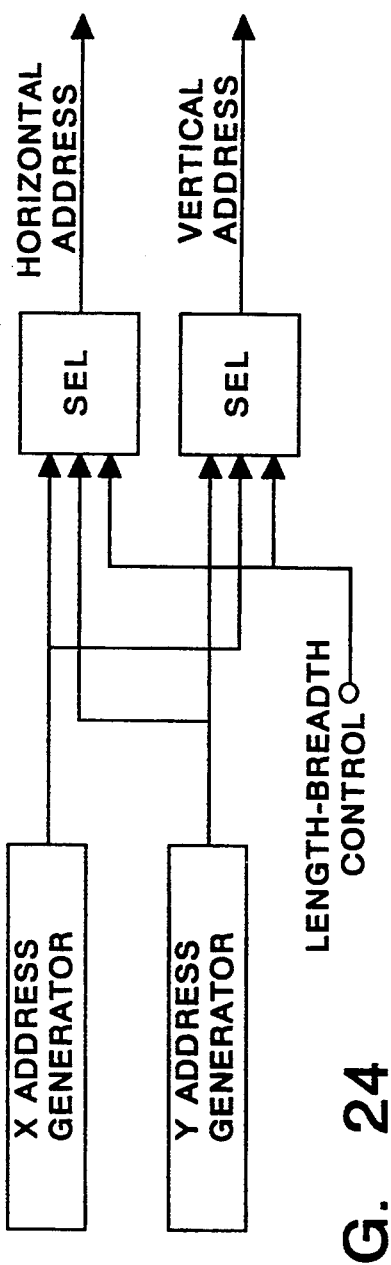
FIG. 24 is a diagram of a circuit for outputting the image while rotating the same.

The address generator 2111 of the DMA controller 1908 is constructed as schematically shown in FIG. 24. Horizontal/vertical direction conversion of X Y addresses is effected based on a lengthwise/breadthwise direction conversion control signal. Of course this control signal is controlled by the CPUB 1901.

The image size used in the described embodiments is selected from A3 and A4 alone. Needless to say, it is possible to perform the same operation by setting the magnification of the DMA controller when other sizes are selected.

The reduction rate is calculated as shown below.

Reduction rate 1/R=(the width of horizontal direction pixel array displayed on the monitor)/(the number of pixels of original image in lateral direction)

In accordance with the present invention, as described above, the displayed state can be changed according to the lengthwise or breadthwise size of the original, and the image can be displayed so as to fully extend within the image display region based on the control of the reduction date R of the DMA controller. In addition, the icon area and the image display area are separated from each other to improve the operability, and only the portion corresponding to the image sheet size is cleared before the image is displayed, thereby facilitating dialogical performance with the operator viewing the monitor.

The contents of the processes shown in FIG. 19 and the other subsequent drawings can be realized by using the system shown in FIG. 1. It is possible to combine the embodiments shown in FIG. 1 and FIG. 19.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system for inputting an image and transmitting the image to a destination system, said image processing system comprising:
   reading means for reading color image information;
   memory means for storing the image information read by said reading means;
   display means for displaying the image information stored in said memory means;
   pointing means for pointing to an arbitrary position on said display means;
   cut out means for cutting out a region to be transmitted from the image displayed on said display means, by demarcating the region with said pointing means;
   designation means for designating an output position of the region cut out by said cut out means for an output medium at the destination system by pointing with said pointing means to a position corresponding to the output position on said display means irrespective of the position of the region in the image displayed on said display means;
   transmission means for transmitting information; and
   control means for controlling said image processing system to transmit an image within the region cut out by said cut out means and attribute information, which includes the output position designated by said designation means, a size of the cut out region and a color mode of the image, to the destination system by using said transmission means.

2. The system according to claim 1, wherein the information of said color mode indicates at least monochrome binary or multi-valued data.

3. An image processing system for transmitting and receiving image information with a destination system, said image processing system comprising:
   reading means for reading color image information;
   memory means for storing the image information read by said reading means;
   display means for displaying the image information stored in said memory means;
   pointing means for pointing to an arbitrary position on said display means;
   cut out means for cutting out, a region to be transmitted from the image displayed on said display means, by demarcating the region with said pointing means;
   designation means for designating an output position of the region cut out by said cut out means for an output medium at the destination system by pointing with said pointing means to a position corresponding to the output position on said display means irrespective of the position of the region in the image displayed on said display means;
   communication means for transmitting and receiving information;
   first control means for controlling said image processing system to transmit an image within the region cut out by said cut out means and attribute information, which includes the output position designated by said designation means, a size of the cut out region and a color mode of the image, to the destination system by using said communication means;

printing means for printing image information; and second control means for controlling said printing means to print an image received by said communication means on an output medium in accordance with the attribute information received by said communication means.

4. The system according to claim 3, wherein the information of said color mode indicates at least monochrome binary or multi-valued data.

5. An image processing system for reading an image and transmitting the image to a destination system, said image processing system comprising:

reading means for reading a plurality of original color images;

memory means for storing image information read by said reading means;

display means for successively displaying images in accordance with the image information stored in said memory means;

pointing means for pointing to an arbitrary position on said display means;

cut out means for cutting out a desired region of each image displayed on said display means by demarcating the region with said pointing means;

designation means for designating a desired output position of the desired region;

transmission means for transmitting information; and control means for controlling said image processing system to transmit image information within the cut out region of each image together with attribute information, which includes the designated output position, size and color mode of each image, as partial images to be combined into one image in the system.

6. An image processing system according to claim 5, further comprising:

display control means for controlling said display means to reduce the image so that the whole of one of the original images stored in said memory means is displayed at one time.

7. An image processing system according to claim 5, wherein said display means includes:

at least two display image memories; and second control means for controlling said image processing system to display a composite image of contents in said two image memories or the contents of one of said two image memories.

8. An image processing system according to claim 7, wherein original images stored in said memory means are transferred to a first display image memory of said display means, and further comprising editing means to transfer the partial images designated by said designation means to positions in a second display image memory such that the partial images are displayed at the positions designated by said designation means.

9. An image processing system according to claim 8, wherein said second control means operates to display the images stored in said second display image memory as desired in order to confirm the combined state of the images output at the transmission destination.

10. An image processing system according to claim 8, wherein if said memory means has a capacity for one sheet of original image, each time the partial image designated by said designation means is transferred to said second display image memory by said editing means, said control means controls the system to transmit the corresponding partial image stored in said memory means and output position information designated by said designation means to the destination system.

11. The system according to claim 5, wherein the information of said color mode indicates at least monochrome binary or multi-valued data.

12. A method for reading an image and transmitting the image, said method comprising the steps of:

inputting image data by reading an image;

storing the input image data in a memory;

displaying the image data stored in the memory on a display;

cutting out a desired region of the image on the display by using a pointing means;

designating an output position of the image data within the cut out region on the display by using the pointing means; and transmitting the cut out image data and attribute information, which includes the output position, size and color mode of the image data, to a destination system.

13. The method according to claim 12, wherein the information of said color mode indicates at least monochrome binary or multi-valued data.

14. A method for image data communication between two systems, said method comprising the steps of:

(a) in a system on a transmission side, inputting image data by reading an image;

displaying the image stored in the memory on a display;

cutting out a desired region of the image displayed on said display means by demarcating the region with a pointing means;

designating a desired output position of the desired region by using the pointing means; and transmitting the image data within the designated region and attribute information, which includes the designated output position, size and color mode of the image data, to a system on the reception side; and (b) in the system on the reception side, receiving the image data and the attribute information, which includes the output position, size and color mode of the image data, transmitted from the system on the transmission side; and printing the received image data on the recording medium in accordance with the received attribute information.

15. The method according to claim 14, wherein the information of said color mode indicates at least monochrome binary or multi-valued data.

16. A method for reading an image and transmitting the image to a destination system, said method comprising the steps of:

inputting image data by reading a plurality of original images;

storing the input image data in a memory;

displaying on a display a plurality of images successively in accordance with the image data stored in the memory;

cutting out a desired region of each image displayed on said display means by demarcating the region with a pointing means;

designating a desired output position of the desired region by using the pointing means; and transmitting the image data within the region cut out on the display and attribute information which includes output position, size and color mode of the image to the destination system.

17. The method according to claim 16, wherein the information of said color mode indicates at least monochrome binary or multi-valued data.

* * * * *

UNITED STATES PATENT AND TRADEMARK OFFICE
CERTIFICATE OF CORRECTION

PATENT NO. : 5,444,550

DATED : August 22, 1995

INVENTOR : MIYUKI ENOKIDA, ET AL.

It is certified that errors appear in the above-identified patent and that said Letters Patent is hereby corrected as shown below:

On the title page, item

[56] References Cited

Foreign Patent Documents, "58-104567  6/1988  Japan" should read --58-104567  6/1983  Japan--.

[63] Related U.S. Application Data

"April 4, 1990" should read --April 24, 1990--.

DRAWING

Sheet 9, Fig. 10, "TILMER" should read --TIMER--.

COLUMN 1

Line 10, "or" should read --and--.

COLUMN 8

Line 53, "CPU122," should read --CPU 122,--.

COLUMN 15

Line 46, "respect" should read --respect to--.

COLUMN 17

Line 34, "for" should read --has--; and

Line 35, "a" should be deleted.

COLUMN 19

Line 11, "a" should read --is a--.

UNITED STATES PATENT AND TRADEMARK OFFICE
CERTIFICATE OF CORRECTION

PATENT NO. : 5,444,550

DATED : August 22, 1995

INVENTOR : MIYUKI ENOKIDA, ET AL.

It is certified that errors appear in the above-identified patent and that said Letters Patent is hereby corrected as shown below:

<u>COLUMN 20</u>

Line 23, "in step" should read --In step--; and "and" should read --an--; and

Line 54, "an" should read --a--.

<u>COLUMN 22</u>

Line 49, "out, a" should read --out a--.

<u>COLUMN 24</u>

Line 35, "on the" should read --on a--.

Signed and Sealed this

Sixteenth Day of January, 1996

*Attest:*

BRUCE LEHMAN

*Attesting Officer*   Commissioner of Patents and Trademarks